United States Patent
Denny, III

(10) Patent No.: US 7,102,626 B2
(45) Date of Patent: Sep. 5, 2006

(54) MULTI-FUNCTION POINTING DEVICE

(75) Inventor: Trueman H Denny, III, Saratoga, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 339 days.

(21) Appl. No.: 10/423,508

(22) Filed: Apr. 25, 2003

(65) Prior Publication Data

US 2004/0212586 A1 Oct. 28, 2004

(51) Int. Cl.
*G09G 5/00* (2006.01)

(52) U.S. Cl. ...................... 345/179; 345/184

(58) Field of Classification Search .............. 345/156, 345/161–167, 179, 184
See application file for complete search history.

(56) References Cited

U.S. PATENT DOCUMENTS

| | | | | |
|---|---|---|---|---|
| 4,982,618 | A * | 1/1991 | Culver ................ | 74/471 XY |
| 5,095,303 | A | 3/1992 | Clark et al. | |
| 5,288,993 | A | 2/1994 | Bidiville et al. | |
| 5,585,823 | A | 12/1996 | Duchon et al. | |
| 5,731,804 | A * | 3/1998 | Rosenberg .............. | 345/156 |
| 5,845,161 | A * | 12/1998 | Schrock et al. ......... | 396/313 |
| 6,057,540 | A | 5/2000 | Gordon et al. | |
| 6,088,020 | A * | 7/2000 | Mor ...................... | 345/156 |
| 6,256,013 | B1 | 7/2001 | Siddiqui | |
| 6,256,016 | B1 | 7/2001 | Piot et al. | |
| 6,307,956 | B1 | 10/2001 | Black | |
| 6,396,479 | B1 | 5/2002 | Gordon | |
| 6,429,848 | B1 | 8/2002 | Merminod et al. | |
| 6,476,375 | B1 | 11/2002 | Nicoud et al. | |
| 6,486,873 | B1 | 11/2002 | McDonough et al. | |
| 6,580,418 | B1 * | 6/2003 | Grome et al. .......... | 345/161 |
| 6,593,907 | B1 * | 7/2003 | Demers et al. ......... | 345/156 |
| 6,597,347 | B1 | 7/2003 | Yasutake | |
| 6,608,616 | B1 | 8/2003 | Lin | |
| 6,611,139 | B1 | 8/2003 | Jackson | |
| 6,924,791 | B1 * | 8/2005 | Nicolas et al. ......... | 345/179 |

FOREIGN PATENT DOCUMENTS

JP 2001350579 * 12/2001

OTHER PUBLICATIONS

Roto View by Innoventions, Inc.; www.rotoview.com innovative Products from inventive minds 10425 Bissonnet Street, Houston, Tx 77099 USA; Tel: 281.879.6226; Fax: 281.879.6415 Title: The intuitive display Navigatin Solution for Hand held Devices.

(Continued)

*Primary Examiner*—Amr A. Awad
*Assistant Examiner*—Tom Sheng

(57) ABSTRACT

A multi-function pointing device is disclosed. The multi-function pointing device is operative to initiate an action in an electronic device in response to a movement of a pointing implement that is movably positioned in a holster. At least one sensor detects the movement (e.g. translation and rotation) of the pointing implement in the holster and outputs a signal indicative of that motion. The action initiated by the electronic device can include manipulating images on a display or a touch sensitive display, scrolling of the display, cursor movement, zooming in and zooming out on an image, and moving between various icons or objects on the display. The pointing implement can be a stylus for manipulating images displayed on a device such as a PDA, cell phone, digital camera, portable computing device, or the like. The multi-function pointing device can be a peripheral component that is connected with the electronic device.

5 Claims, 24 Drawing Sheets

OTHER PUBLICATIONS

Pending US application-Filed: Nov. 21, 2002; U.S. Appl. No. 10/302,434; inventor Thomas C Mandle; title: Method and System for Switching Power and Loading and closing applicaiton s in a portable computing device using a removable pointing device.

R & D "WhatWorks"; Business 2.0; Optical Mouse; www.business2.com; Oct. 2001; p. 138.

Integrated Circuits; Data Sheet; Philips semiconducotrs; Product specificaiton Data Handbook IC20; May 1, 1996; tpm749 Microcontroller with TrackPoint Microcode from IBM; pp. 1-14.

Control and Input Work Group; Title Operation- Product controls and information input elements or types of controls and input; pp. 1-13.

Pointing Devices for Navigation in Windows-based Machine-Controllers; D .Zuhlke, L. Krauss, University Kaiserslautern, Institute for Production Automation, Germany; MMI-Interaktiv, Nr. 1, Marz/ OO, Zuhlke/Krauss; pp. 1-9.

Usability Test; AccuPoint Feature on the toshiba Satellite 1555 CDS; By Amanda Sapp, Graduate Student, Ball State University; Introduction subjects methodology Results Discussion conclusion Appendix references; pp. 1-9.

Proceedings of Graphics Interface 2001; an Isometric Joystick as a Pointing Device for Handheld Information Terminals; pp. 119-126.

Philips CFT: Centre for Industrial Technology; Philips CFT develops revolutionary laser-based scrolling devi Introducing the Laser Scrolling Device; pp. 1-2.

Optics.org, the online photonics resource; Optical scrolling Otical mouse saves space; pp. 1-2; Jun. 26, 2002 IntelliEye Mouse; Nov. 5, 1999; written by: David "Spunk" Grampa.

Series 109 3D SurfStik; 3 Axis Ceramic Strain Gage Pointing Device;CTS Resistor/Electrocomponents; pp. 27-31.

Series 108 3DTrackStik,p.1-5; www.ctscorp.com/resistor/108.htm.

New Product Information; Micro-joy Stick Switch with a Center Push Function, 1st in the industry, developed; Sep. 18, 2001; www.smk.co.jp/smke/new/html595csc-e.html.

IBM corporation; Almaden Research Center; User system Ergonomics Research; Simulated TrackPoint Strain Gauge sensor;pp. 1-6; http://trackpoint.almaden.ibm.com/files/fstick3a.html.

Trackpoint Resistor Values; pp. 1-4; Fritzie mateo; fmateo@almaden.ibm.com; Nov. 97.

Joytest; DOS program for testing Track Point; written by Bob Olyha, IBM Research Division, rolyha@us.ibm.com; htt;// trackpoint.almaden.ibm.com/files/Joytst.htm/.

Optical technology for optimal performance; Optical technology for optimal performance; Dec. 6, 2002; pp. 1-4; www.zdnetindia.com/ print.html.

Incredible Mouse; created by: Nikki Carr and Brian Abreu; www. sanjuan.edu/schools/arcade/mouseCA.html; p. 1-2.

Color and a Pentium to go; Jul. 1995; Quirky design mars the well-equipped Toshiba 4900CT; www.byte.com/art/9507/sec9/art7. htm; p. 1-4.

* cited by examiner

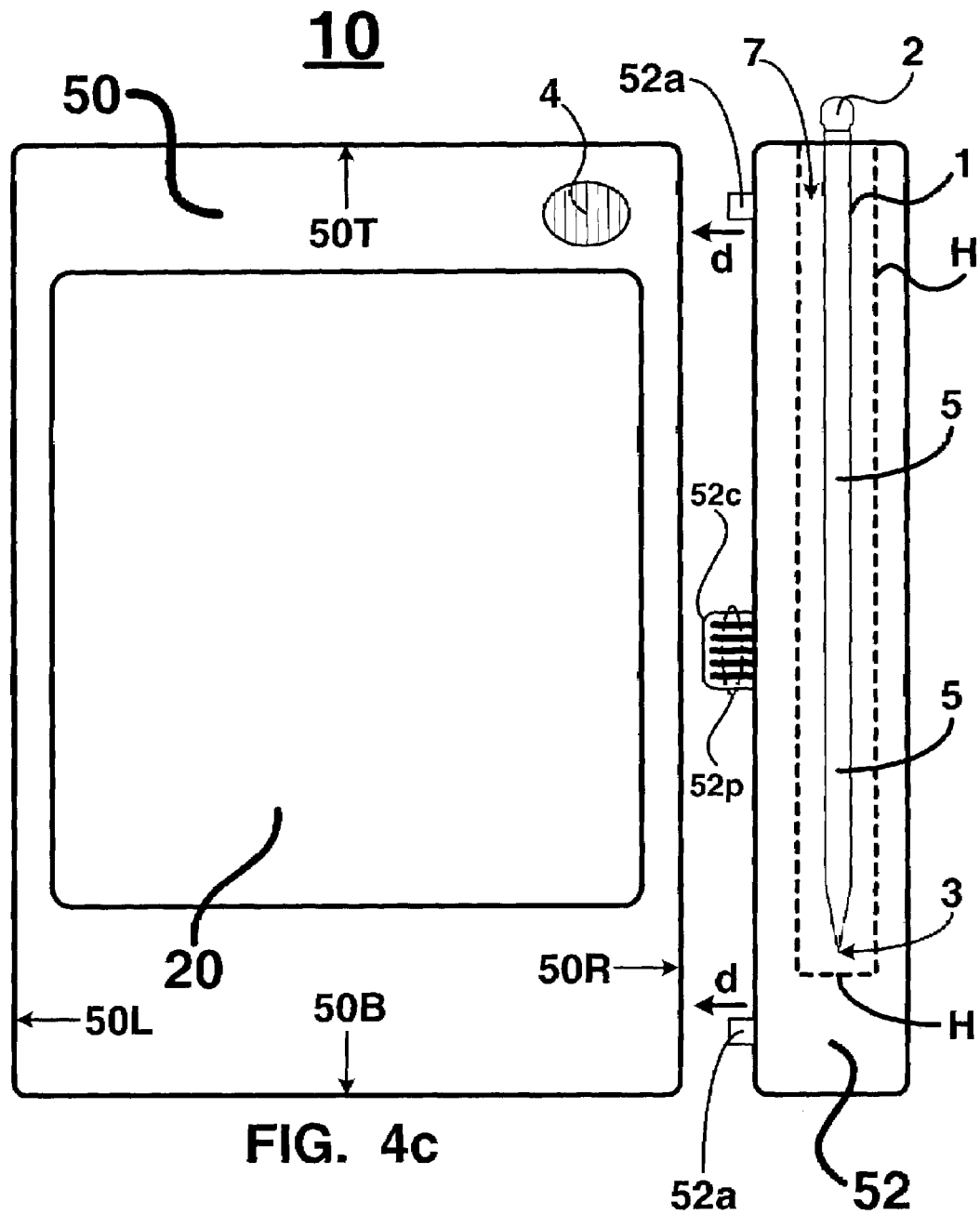
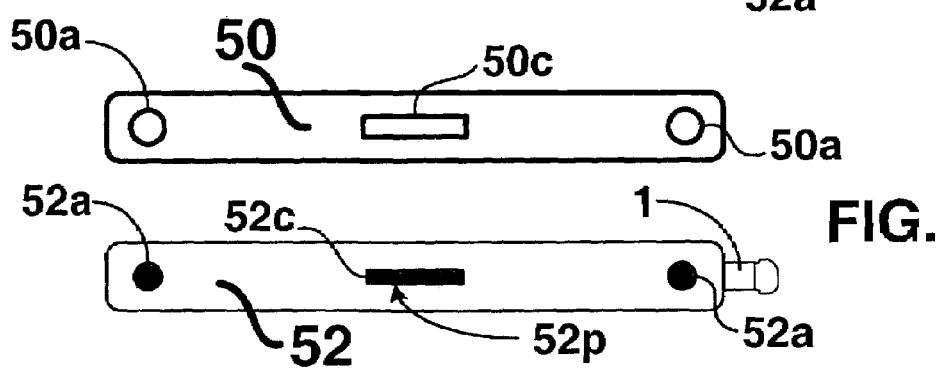
FIG. 4c
FIG. 4d

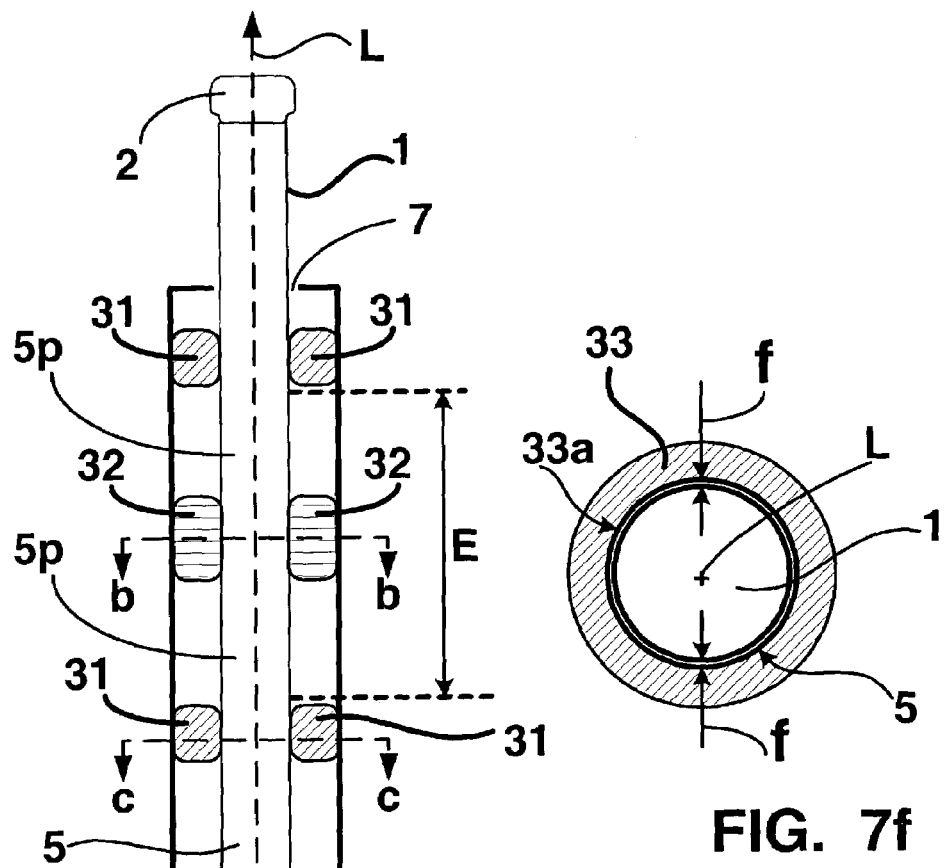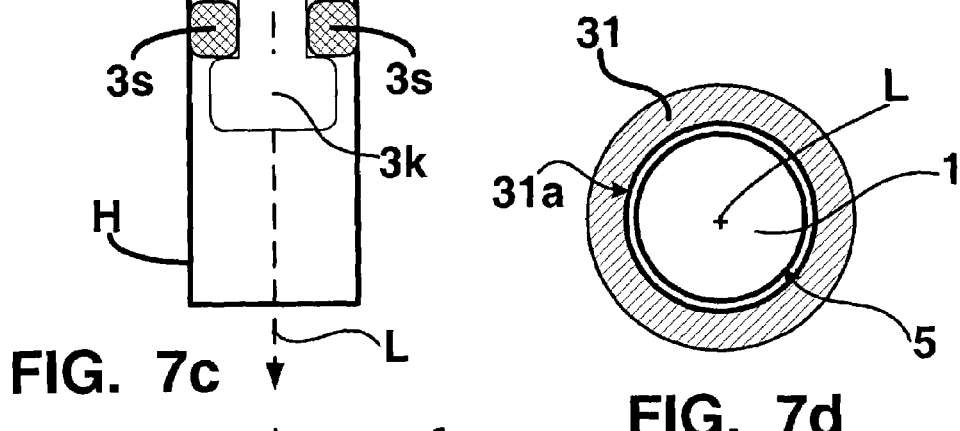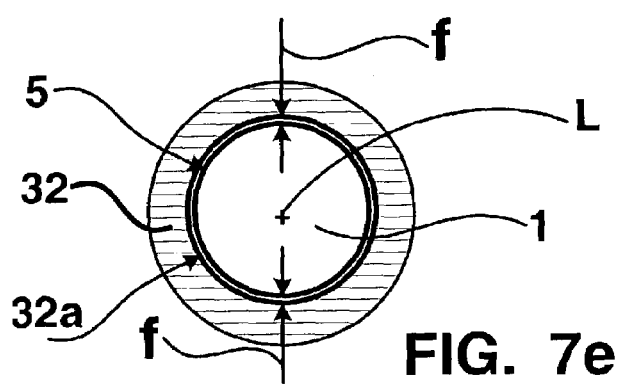

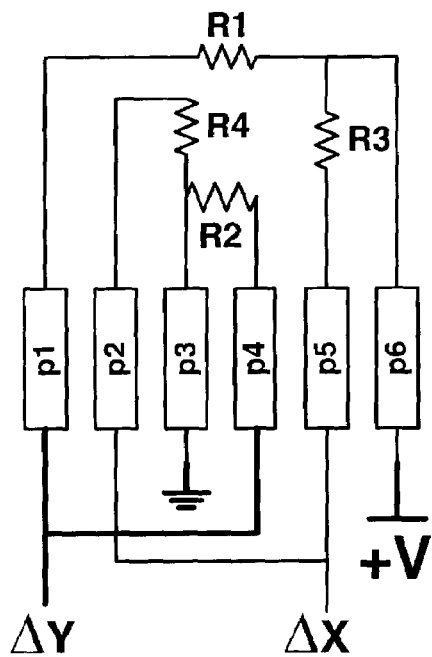
FIG. 19a
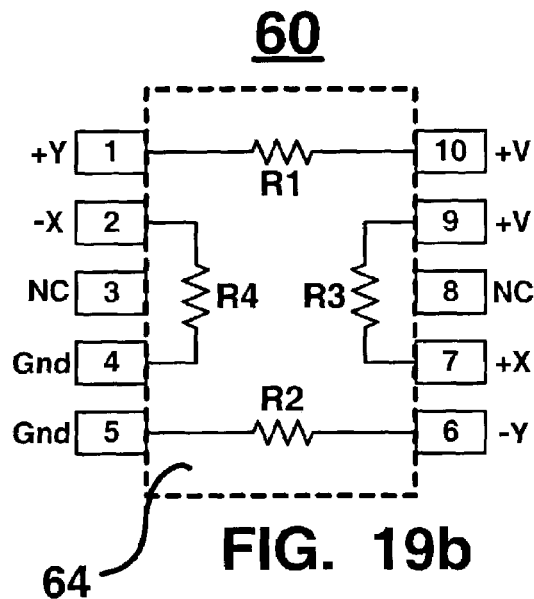
FIG. 19b
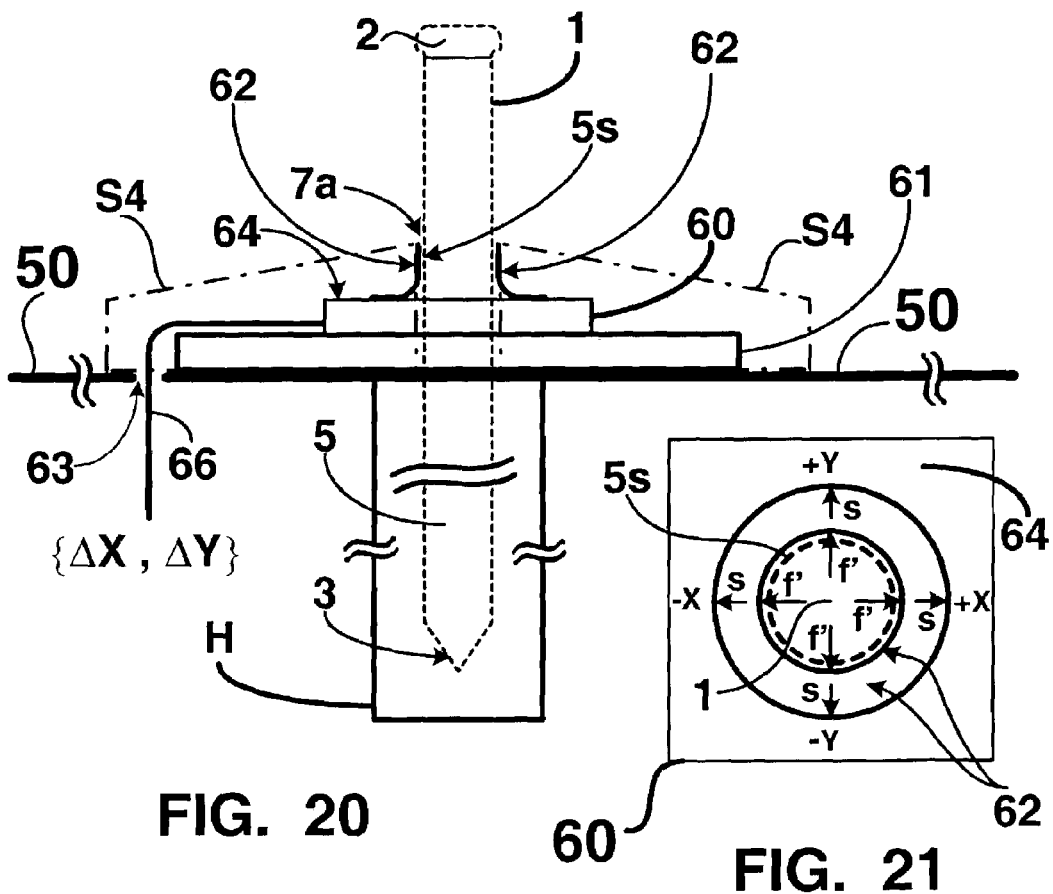
FIG. 20
FIG. 21

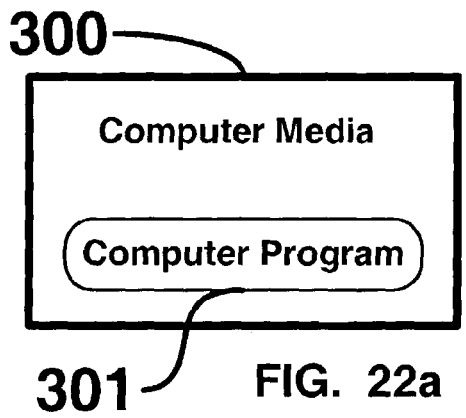
FIG. 22a
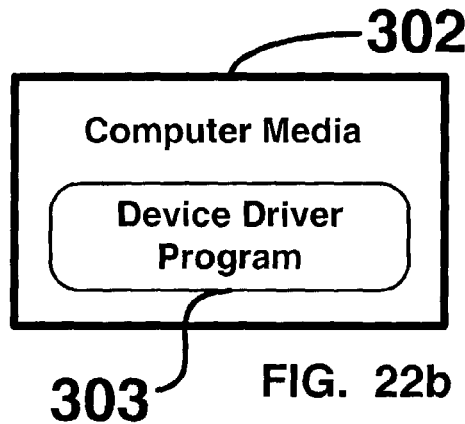
FIG. 22b
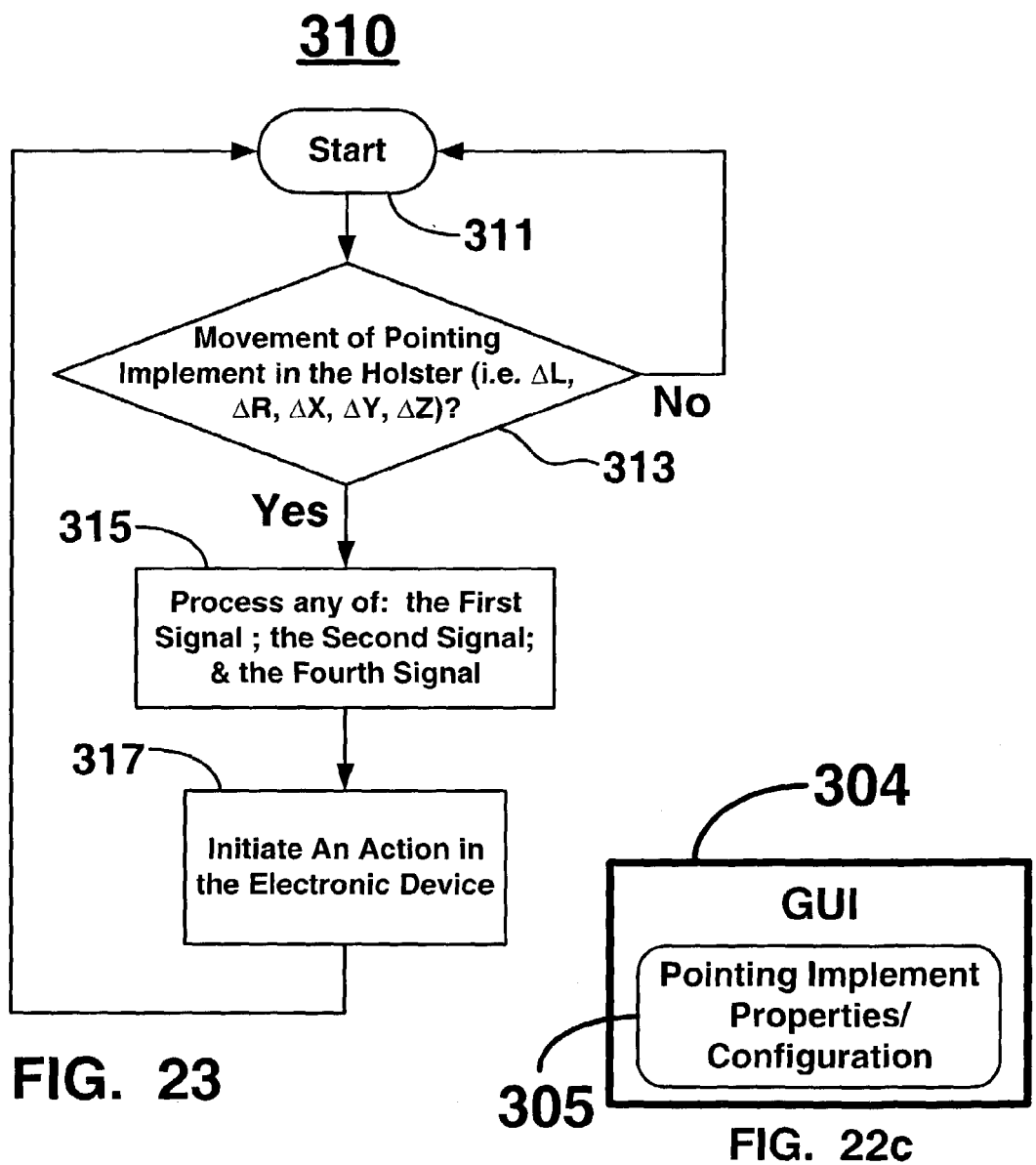
FIG. 22c
FIG. 23

MULTI-FUNCTION POINTING DEVICE

FIELD OF THE INVENTION

The present invention relates generally to a multi-function pointing device. More specifically, the present invention relates to a multi-function pointing device that includes a pointing implement that is holstered in a holster and operative to initiate an action in an electronic device in response to a motion of the pointing implement in the holster.

BACKGROUND OF THE INVENTION

Portable computing devices and portable electronics devices are becoming increasingly more common place. Users of those devices expect more and more information to be displayed on a display carried by the device. For example, cell phones, Personal Digital Assistants (PDA's), a cell phone/PDA combination, hand held remote controls for TV's, stereo systems, digital cameras, digital video recorders, and global positioning system (GPS) receivers, are examples of electronic devices that possess state of the art image displays such as color Liquid Crystal Displays (LCD). One challenge presented by any display is the ability to easily manipulate information displayed on the display and to effectuate an action based on what type of information is displayed. For example, the execution of a program by touching a stylus to an icon on the display. For electronic devices with a touch-sensitive display that is operative to receive commands and execute actions based on touching the screen with a stylus, a user must first grab hold of the stylus by either unsnapping it from a clip or removing the stylus from a slot in which the stylus is stored when it is not needed.

One disadvantage of having to remove the stylus is that in some situations it is inefficient from an ergonomic standpoint for the user to use the stylus on the touch-sensitive display for certain functions, such as scrolling the screen up and down or left and right.

As one example, if a map displayed on a touch-sensitive screen of a PDA is too large to be displayed in its entirety on the screen, then the user must remove the stylus and then use the left/right and/or up/down scroll bars to move the image of the map around on the screen to see various portions of the map that are off-screen. Similarly, when joy sticks, cursor pads, track balls, or the like are used, they typically require movement of a cursor to position the cursor over the scroll bars followed by pressing another button that allows the scroll bar to be moved with the motion of the cursor. Alternatively, a scroll wheel that is moved back and forth by a finger of the user is used to move the scroll bar, but usually, only the vertical scroll bar is moved by the scroll wheel.

In FIGS. 1a and 1b, a prior electronic device 200 includes a housing 202, a touch-sensitive screen 211, a power switch 204, and a stylus 201 having a tip 203 for touching the screen 211. The stylus 201 is carried by the electronic device 200 and is stored in a slot 231 (see FIG. 2a) and withdrawn $W_d$ when needed. The electronic device 200 also includes a cursor pad 210 for selecting icons 215 or other information displayed on the screen 211 and one or more function buttons 208. Other icons such as 213 for opening a list of programs or 206 for closing a program can be displayed on the screen 211 and can be activated by touching the tip 203 of the stylus to the icon. For purposes of illustration, the prior electronic device 200 depicted is typical of a PDA, but the prior electronic device 200 can be any electronic device in which a stylus is used to manipulate information displayed on a touch sensitive screen.

In FIGS. 2a through 2b, other features of the electronic device 200 can include a slot 231 for storing the cursor 201, an accessory port 235 for devices such as memory cards or other peripherals, a headphone jack 237 for listening to audio information via headphones, a cover 215 for protecting the screen 211 when not in use, and a port 241 for docking the electronic device 200 to a cradle, a docking station, a keyboard, or the like, and a reset button 243.

Because the screen 211 has a limited area dictated by its portable use, all of the information in an image memory (not shown) cannot be displayed in its entirety on the screen 211. For instance, in FIGS. 1a and 1b, icons 217 are not fully on the screen 211, while other icons 215 are displayed in their entirety on the screen 211.

Accordingly, the stylus 201 is often used to scroll the images on the screen 211 such that the icons 217 can be brought into full view on the screen 211. A vertical scroll bar 221 can be touched by the stylus 201 to scroll the images up or down on the screen 211 as indicated by a pair of up/down arrows 223. In some cases, the up/down arrows 223 can also be touched by the stylus 211 to scroll the images up or down. Similarly, a horizontal scroll bar 225 can be touched by the stylus 201 to scroll the images left or right on the screen 211 as indicated by a pair of left/right arrows 227. In some cases, the left/right arrows 227 can also be touched by the stylus 211 to scroll the images left or right. A finger of a user (not shown) may also be used to accomplish some or all of the same functions as the stylus 211 by touching a tip of the finger to the screen 211.

Alternatively, the cursor pad 210 or a track ball 212 (see FIG. 1b) can be used to move a cursor 219 across the screen 211 to select the scroll bars or arrows (221, 223, 225, 227) to scroll the screen 211. Typically, another control such as one of the function buttons 208 or track ball buttons 214 must be pressed while manipulating the track ball 212 or cursor pad 210 in order to effectuate a scrolling of the screen 211.

Because the ergonomic needs of a users will vary, the above mentioned pointing devices are not optimal for every user under all conditions of use. Therefore, the above mentioned pointing devices can have several disadvantages for some users.

The disadvantages to using the track ball 212 include its sensitivity to vibrations that can cause the users hand and/or finger to be jarred by the vibrations (particularly in mobile applications) resulting in inaccurate pointing. Moreover, two hands are usually required to accomplish a task using the track ball 212, one hand to hold the electronic device 200 and another hand to manipulate the track ball 212. Additionally, for drag-and-drop operations, usually one of the function buttons 208 or the track ball buttons 214 must be pressed. As a result, two hands are required and often two fingers are also required. The use of the buttons (208, 214) may require the user to focus on those buttons in order to activate them, thus distracting the user from the information being displayed on the screen 211. The track ball 212 and the buttons (208, 214) are also difficult to use when gloves are worn by the user.

The disadvantages of using a finger (not shown) as a pointing device on the screen 211 include finger prints can be smeared on the screen 211, the view of the screen 211 is obscured by the users fingers or hand, input resolution is low especially if the users fingers are large, drag-and-drop operations require the use of two hands, many touch-sensitive screens 211 may not respond to pointing inputs if the user is wearing gloves, and the finger can not be used as a pointing device when the cover 251 covers the touch-sensitive screen 211.

The disadvantages to the buttons (208, 214) include the user can make mistakes with respect to selection of the proper button, the buttons may be two small for the fingers of some users, the buttons may not be easy to discern from one another by tactile feel, size, or shape, the buttons may not provide sufficient tactile feedback to signal successful activation, and buttons are hard to activate if gloves are worn by the user.

A disadvantage of the scroll wheel 200*t* is that only one of the scroll bars (221, 225) can be scrolled by the scroll wheel 200*t*. Usually it is the vertical scroll bar 221. Therefore, if it is desired to scroll an image left and right, the scroll wheel 200*t* will have to be abandoned in favor of the stylus 201 or the user must configure the electronic device 200 via a software menu to scroll an image left and right using the scroll wheel 200*t*.

Disadvantages of a joystick (not shown), or miniature joysticks such as the TrackPoint® by IBM®, the Accu-Point® as used in Toshiba® laptops, and other isometric joysticks/pointing devices are that they can be less useful if the electronic device 200 is to be used in a vertical orientation, they can be hard to control accurately if gloves are used or the users fingers are too large, they are not ergonomically efficient for all users and are not often positioned for manipulation by a users thumb, often two hands are required to use the isometric joystick, and in many cases the isometric joystick only moves the cursor but does not allow for selection of an action without the use of another control button.

Finally, the disadvantages to using the tip 203 of the stylus 201 include the stylus 201 must be removed from its slot 231 which can result in the stylus 201 being lost or misplaced, the stylus 201 can be hard to use when gloves are worn, two hands are needed to easily use the stylus 201, the stylus 201 is typically placed on a right hand side of the electronic device 200 so that the ergonomic needs of left hand users are not met by a right hand side placement of the stylus 201, and the stylus 201 can not be used as a pointing device when the cover 251 is over the touch-sensitive screen 211 because the tip 203 is prevented from touching the screen 211.

Therefore, there exists a need for a pointing device that can serve multiple functions and can be used to manipulate information displayed on a display while positioned in a slot or the like that stores the pointing device. There is also a need for a pointing device that allows information displayed on a display to be manipulated when the display is covered by a transparent cover or the like. Finally, there exists a need for a pointing device that is flexible enough to accommodate the ergonomic needs of a variety of users.

SUMMARY OF THE INVENTION

Broadly, the present invention is embodied in a multifunction pointing device that is connected with an electronic device and includes a pointing implement including a shaft. The multifunction pointing device further includes a holster connected with the electronic device. The holster includes an aperture through which the pointing implement is inserted into the holster and is removed from the holster. A portion of the shaft is positioned in the holster and is movable in a rotation about an axis of the holster and is also movable in a translation along the axis. A first sensor is positioned to detect the translation and the rotation of the portion of the shaft while the pointing implement is in the holster. The first sensor is operative to generate a first signal in response to the translation and the rotation of the portion of the shaft. The electronic device receives the first signal and processes the first signal to initiate an action. The action can include manipulating data displayed on a display of the electronic device. If the display is a touch-sensitive display, then the pointing implement can include a tip operative to initiate an action when the tip is positioned in contact with the touch-sensitive display.

Advantages of the multifunction pointing device include the ability to initiate an action including scrolling images displayed on the touch-sensitive display up and down and/or left and right in response to the translation and the rotation of the shaft of the pointing implement "without" having to remove the pointing implement from its holster.

Another advantage of the multifunction pointing device is that the action initiated can be any action that can be implemented in hardware, programmed in software, or a combination of hardware and software so that the multifunction pointing device can perform a variety of different functions. Particularly, if software, device drivers, and GUI menus are used to select functions that the multifunction pointing device will perform.

Other aspects and advantages of the present invention will become apparent from the following detailed description, taken in conjunction with the accompanying drawings, illustrating by way of example the principles of the present invention.

BRIEF DESCRIPTION OF THE DRAWINGS

FIG. 4*c* is a schematic view of a peripheral component that docks with an electronic device according to the present invention.

FIG. 4*d* is a side-plan view of the peripheral component and the electronic device of FIG. 4*c* according to the present invention.

FIG. 7*c* is a schematic view depicting various elements of a holster and a pointing implement according to the present invention.

FIGS. 7*d* and 7*e* are cross-sectional views depicting an alignment element and a resistance element respectively according to the present invention.

FIG. 7*f* is a cross-sectional view depicting an alignment-resistance element according to the present invention.

FIGS. 18, 19a, and 19b are electrical schematics depicting a forth sensor according to the present invention.

FIG. 20 is a cross-sectional view of a fourth sensor, a holster, and a pointing implement according to the present invention.

FIG. 21 is a top plan view depicting a first force and a stress force acting on a fourth sensor according to the present invention.

FIGS. 22a and 22b are block diagrams depicting a computer readable media for carrying a program according to the present invention.

FIG. 22c is a block diagram depicting a graphical users interface and a user configuration program according to the present invention.

FIG. 23 is a flow diagram depicting an algorithm for initiating an action resulting from a signal from the first, second, and fourth sensors according to the present invention.

DETAILED DESCRIPTION

Figure 1A:
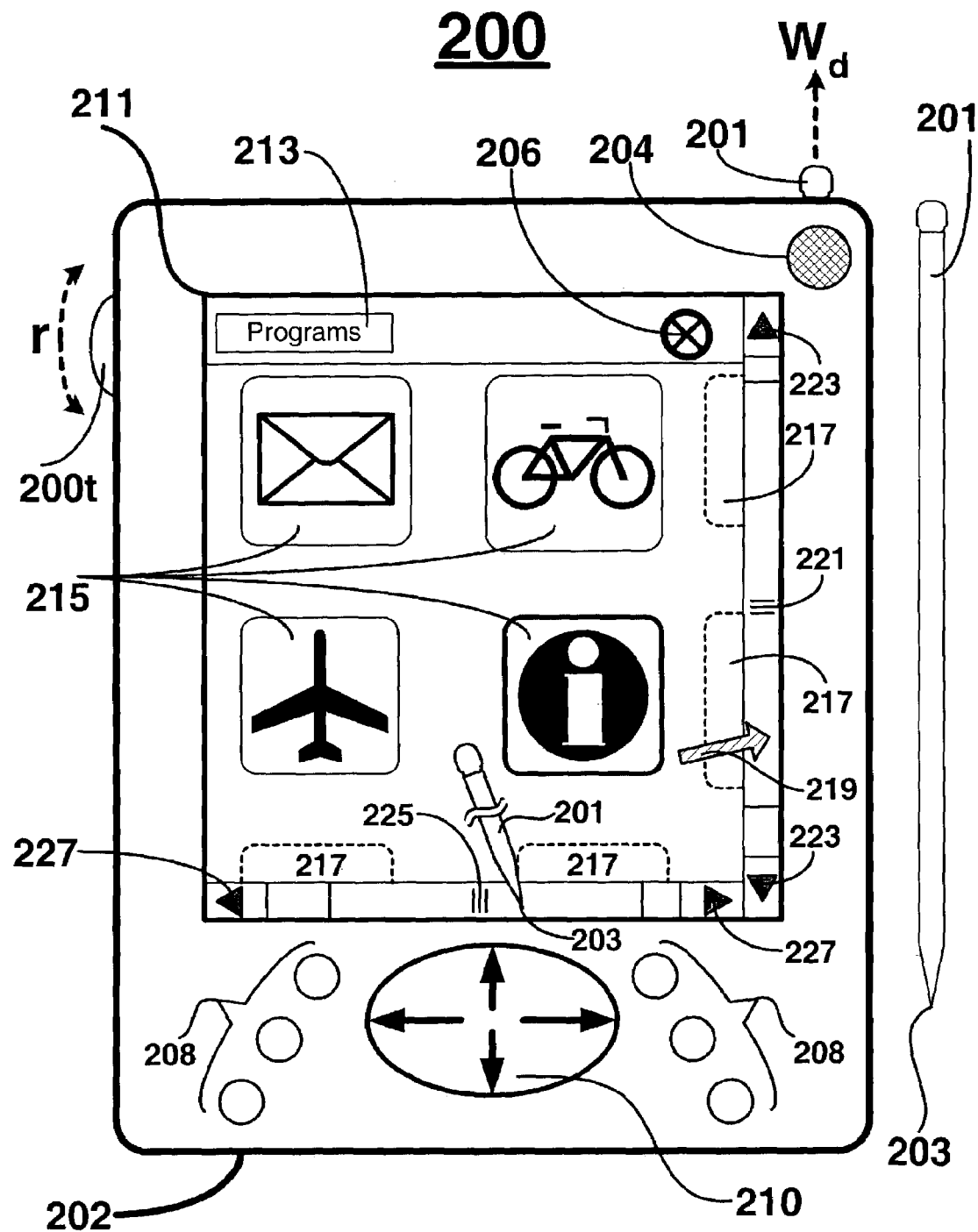
FIGS. 1*a* and 1*b* depict prior electronic devices that use a hand-held stylus to manipulate data on a touch-sensitive screen.
Figure 1B:
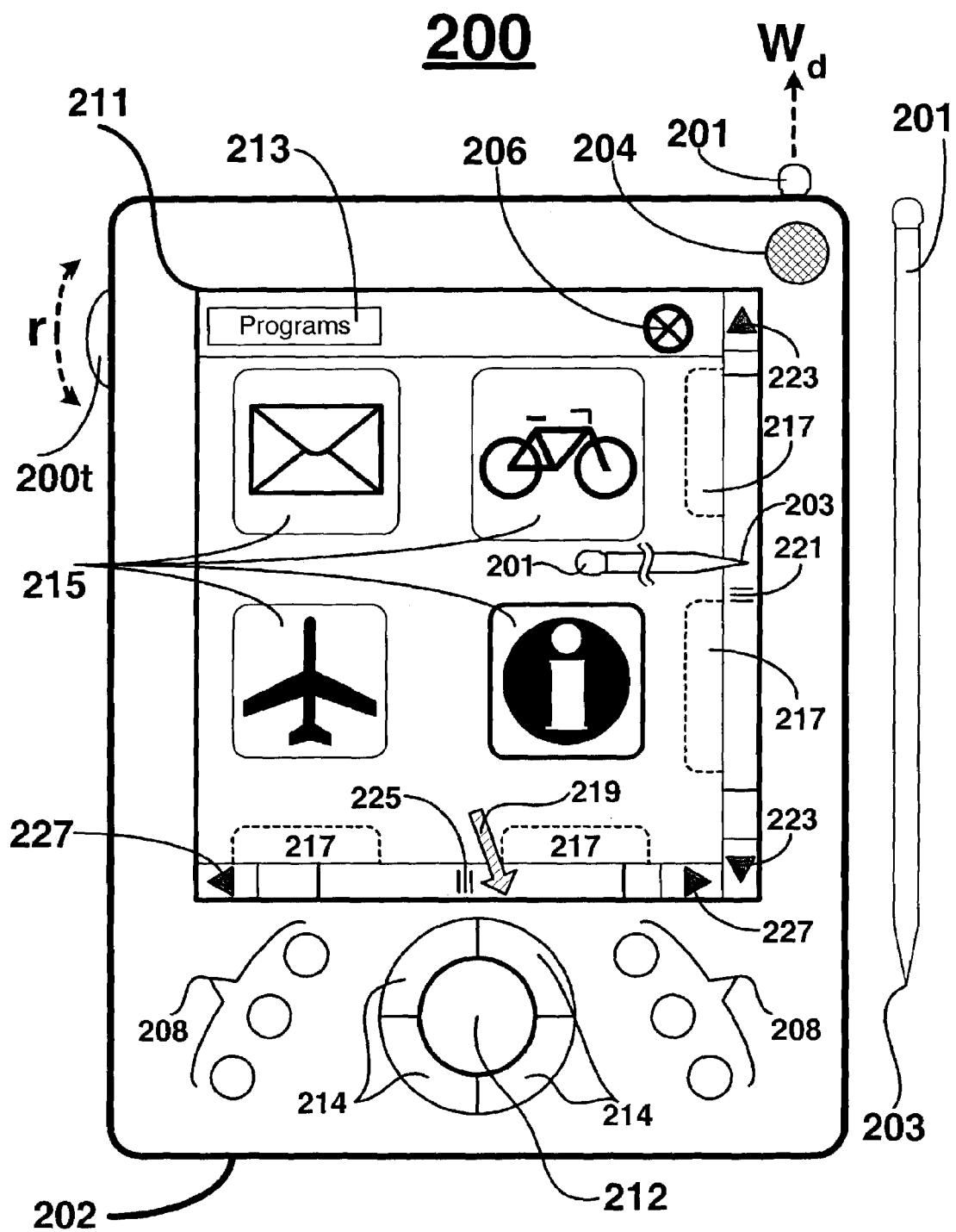
Figure 2A:
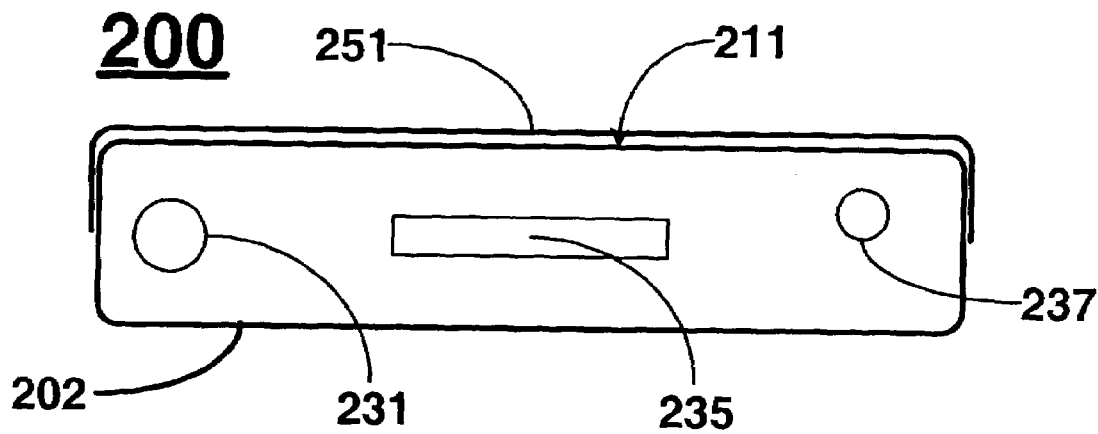
FIGS. 2*a*, 2*b*, and 3 depict other features that may be found on the prior electronic device of FIGS. 1*a* and 1*b*.
Figure 2B:
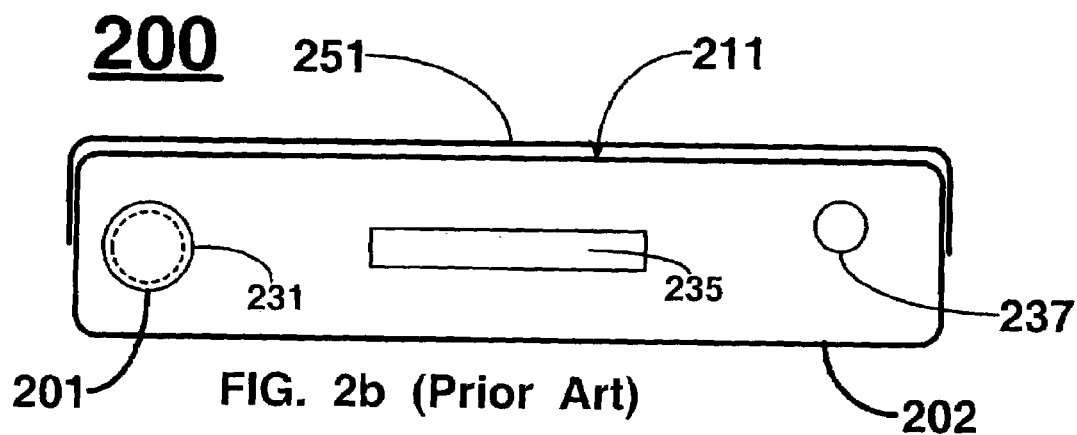
Figure 3:
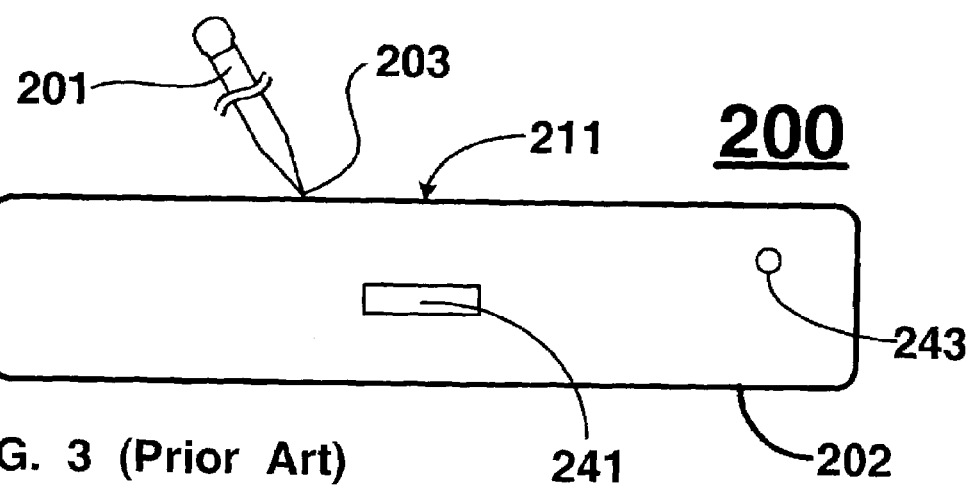

In the following detailed description and in the several figures of the drawings, like elements are identified with like reference numerals.

As shown in the drawings for purpose of illustration, the present invention is embodied in a multifunction pointing device that is connected with an electronic device and including a pointing implement that includes a shaft. A holster is connected with the electronic device and includes an aperture through which the pointing implement is inserted into and is removed from the holster. A portion of the shaft is positioned in the holster and is movable in the holster in a rotation about an axis and is movable in the holster in a translation along the axis. A first sensor is positioned to detect the translation and the rotation of the portion of the shaft and generates a first signal in response to the translation and the rotation. The electronic device receives the first signal and processes the first signal to initiate an action.

One advantage of the present invention is that the action initiated by the electronic device can be any action that can be programmed using software, implemented using hardware, or a combination of hardware and software.

Another advantage of the present invention is that the pointing implement can be used to initiate actions such as manipulating data displayed on a touch-sensitive screen "without" having to completely remove the pointing implement from the holster. Consequently, one hand may be used to hold the electronic device and the same hand can be used to rotate and to translate the pointing implement in the holster to effectuate an action in the electronic device.

In FIGS. 4a, 4b, 5, and 6, a multifunction pointing device 10 is connected with an electronic device 50. The multifunction pointing device 10 includes a pointing implement 1 including a shaft 5, a holster H connected with the electronic device 50 and including an aperture 7 through which the pointing implement 1 can be inserted into and removed (i.e. un-holstered) from the holster H. A portion 5p of the shaft 5 is positioned in the holster H. The portion 5p is movable in a rotation R about an axis L (e.g. clockwise CW and counter clockwise CCW) and is movable in a translation U/D (e.g. up and down) along the axis L. The axis L is illustrated in reference to the holster H in order to depict how the translation and rotation relate to the movement of the pointing implement 1 in the holster H. Optionally, the pointing implement 1 can include an end piece 2 positioned at a proximal end of the shaft 5 and adapted to make the pointing implement 1 easy to grasp with the fingers of a users hand (not shown).

A first sensor S1 is positioned to detect the translation U/D and the rotation R of the portion 5p of the shaft 5. The first sensor is operative to generate a first signal ($\Delta L$, $\Delta R$) in response to the translation (i.e $\Delta L$) and the rotation (i.e $\Delta R$). The electronic device 50 receives the first signal ($\Delta L$, $\Delta R$)

and processes the first signal (ΔL, ΔR) to initiate an action in the electronic device 50. The action initiated by the electronic device 50 can be any action that can be implemented in software, hardware, or a combination of hardware and software.

As will be discussed below, the pointing implement 1 may optionally include a tip 3 positioned at a distal end of the shaft 5. The pointing implement 1 can be completely removed from the holster H and used in a stylus mode with a touch-sensitive display by placing the tip 3 in contact with the touch-sensitive display.

In FIGS. 4a, 4c, 10, 11, and 12, the electronic device 50 can include a display 20 for displaying a variety of data and images including but not limited to on-screen icons 21, off-screen icons 23b and 23r, a start menu icon 25a for selecting programs to be started, a close program icon 25b for closing already opened programs, a vertical scroll bar 22 that can include up/down arrows 24, and a horizontal scroll bar 26 that can include left/right arrows 28. The electronic device 50 can also include a power button 4 for turning on or turning off the electronic device 50, a cursor pad 40 for moving a cursor 30 (see FIG. 12) around the display 20, and one or more function buttons 41 that can be used individually or in conjunction with the cursor pad 40 for selecting actions or selecting an option from among a variety of options displayed on the display 20.

The display 20 can be a display type including but not limited to a light emitting diode (LED) display, a liquid crystal display (LCD), and a touch-sensitive display (also commonly referred to as a touch-sensitive screen). The display 20 can also be one or more indicator lights, annunciator lights, LED's, or the like, and the display 20 need not be able to display images (e.g. graphics) as in the case of a LCD display. For instance, the display 20 may only display numeric information or alpha-numeric information. As an example, the electronic device 50 can be a CD player, MiniDisc (MD) player, or a digital audio player such as a MP3 player in which music track, title, and time data are displayed on the display 20 in an alpha-numeric format.

Figure 4A:
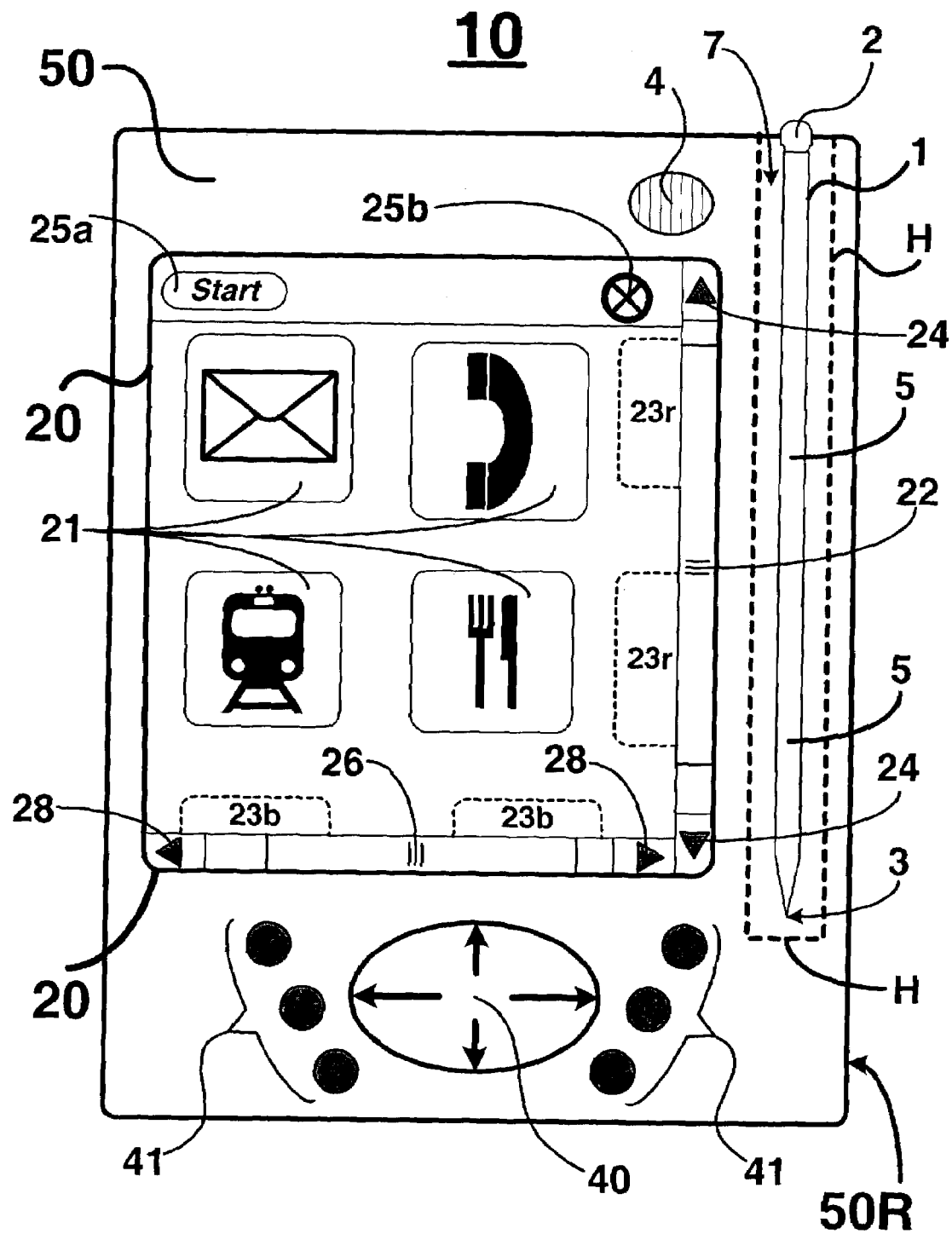
FIG. 4*a* is a schematic view of a multifunction pointing device according to the present invention.

As an example, when the pointing implement 1 is unholstered (i.e. completely removed from the holster H) and is used in a stylus mode. The display 20 can be a touch-sensitive display, and the tip 3 can contact the display 20 to initiate a stylus mode action in the electronic device 50. In FIG. 4a, examples of the stylus mode actions that can be initiated by a contact of the tip 3 with the display 20 include but are not limited to touching the vertical scroll bar 22 or its up/down arrows 24 to effectuate a scrolling action on the display 20 such as scrolling the off-screen icons 23b at the bottom of the display 20 into full view and touching the horizontal scroll bar 26 or its left/right arrows 28 to scroll the off-screen icons 23r on the right side of the display 20 into full view. As another example, the on-screen icon 21 of an envelope can be contacted by the tip 3 to open an email program. The email program can then be closed by pressing the tip 3 against the close program icon 25b.

Those uses for the pointing implement 1 in the stylus mode as a stylus to be gripped by the hand of a users and touching the tip 3 to the display 20 (i.e. a touch-sensitive display) to initiate a stylus mode action are well known in the art.

However, the multifunction pointing device 10 of the present invention provides for multiple pointing functions that can be performed by the pointing implement 1 while it is still fully or partially holstered in the holster H such that a user need not completely remove the pointing implement 1 from the holster H to initiate an action in the electronic device 50.

Moreover, the multifunction pointing device 10 of the present invention provides for flexibility of use of the pointing implement 1 to initiate actions in the electrical device 50 because the pointing implement 1 can serve as both a stylus pointing device in the stylus mode and as a pointing device while holstered in the holster H. On the other hand, as will be described below, the multifunction pointing device 10 of the present invention can be configured so that the pointing implement cannot be removed from the holster H but still retains its ability to initiate actions in the electronic device 50. For instance, when the display 20 is not a touch-sensitive display, then there is no need for the pointing implement 1 to be removably positioned in the holster H. One advantage of preventing the removal of the pointing implement 1 is that it cannot be lost or misplaced.

Figure 5:
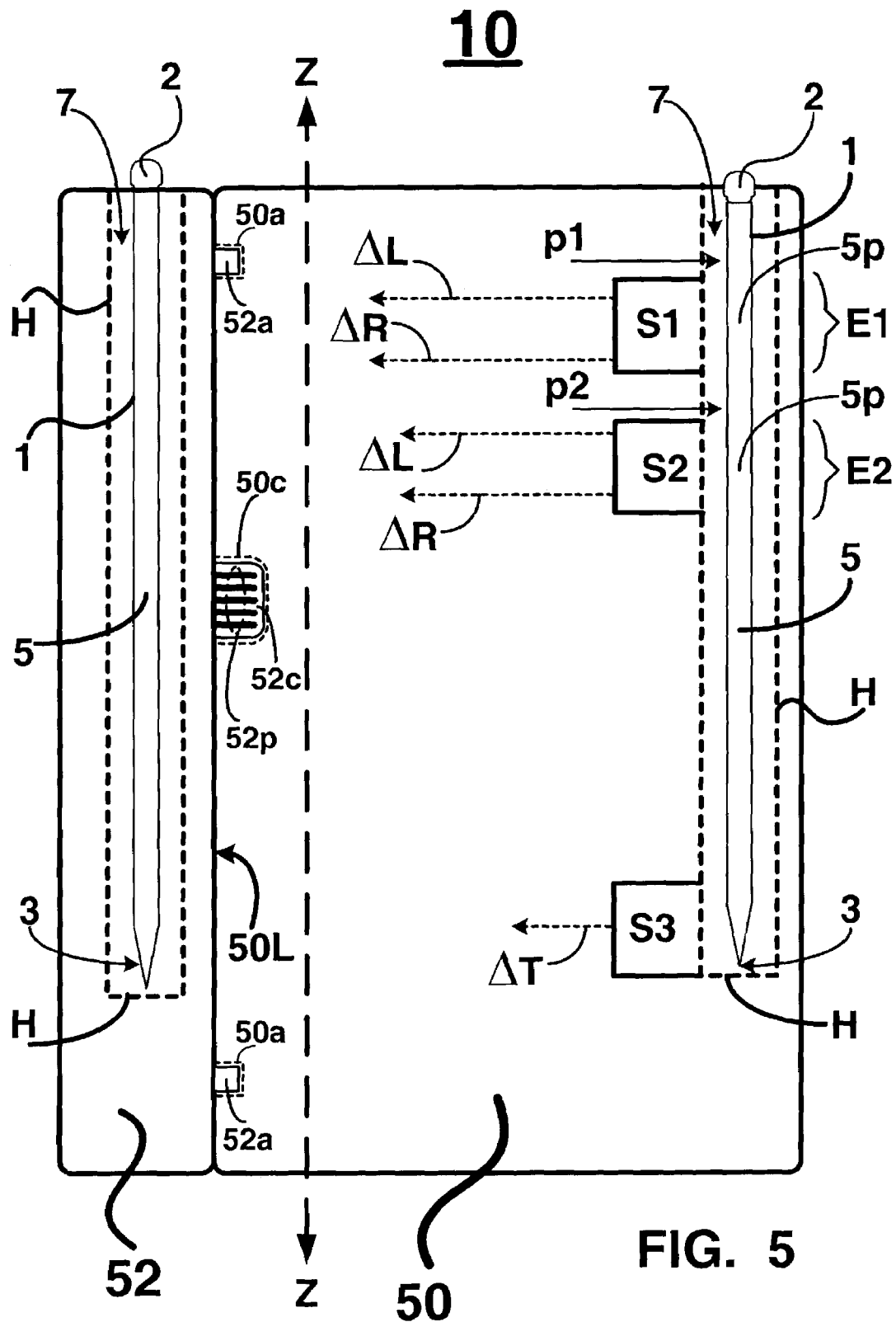
FIG. 5 is a schematic view depicting first, second, and third sensors, a holstered pointing implement, and a docked peripheral component according to the present invention.
Figure 6:
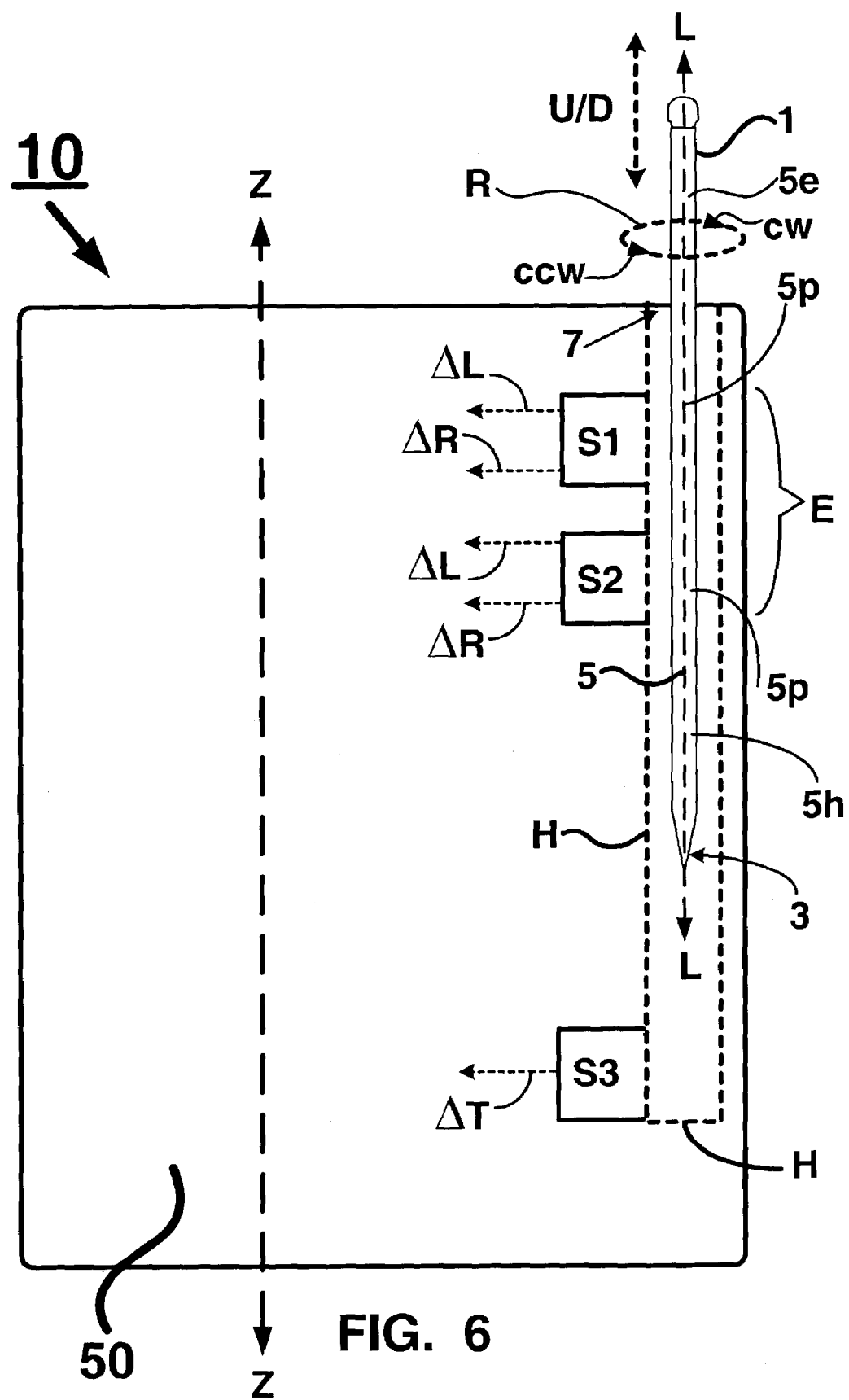
FIG. 6 is a schematic view depicting a translation and a rotation of a partially holstered pointing implement according to the present invention.

In FIGS. 5 and 6, the multifunction pointing device 10 further includes a first sensor S1 that is positioned to detect a rotation R about an axis L and a translation U/D along the axis L of a portion 5p of the shaft 5 of the pointing implement 1. Although the entire pointing implement 1 is rotated and translated, the first sensor S1 detects only the rotation R and translation U/D of the portion 5p of the shaft 5 that is within a first sensor range E1 of the first sensor S1. That is, so long as the portion 5p of the shaft 5 is within the first sensor range E1, then the rotation R and the translation U/D of the pointing implement 1 can be detected by the first sensor S1.

The first sensor S1 is operative to generate a first signal (ΔL, ΔR) in response to the translation (i.e ΔL) and the rotation (i.e ΔR). Although the first signal (ΔL, ΔR) is illustrated as being two separate signals in FIGS. 5 and 6, the first signal (ΔL, ΔR) can be encoded in any manner (digital or analog) and may appear on one or more signal lines (two are shown) from the first sensor S1. When only the first sensor S1 is used to detect both the translation U/D and the rotation R, then the first signal comprises both ΔL and ΔR. The electronic device 50 receives the first signal (ΔL, ΔR) and then processes the first signal (ΔL, ΔR) to initiate an action. As used herein, the translation U/D along the axis L is synonymous with ΔL and the rotation R about the axis L is synonymous with ΔR.

In some applications it may be desirable to have one sensor to detect only the translation U/D and another sensor to detect only the rotation R. In one embodiment of the present invention, as illustrated in FIGS. 5 and 6, the multifunction pointing device 10 includes a second sensor S2 positioned to detect the translation U/D of the portion 5p of the shaft 5. The second sensor S2 is operative to generate a second signal ΔL in response to the translation U/D. In this embodiment, the first sensor S1 detects only the rotation R of the portion 5p of the shaft 5 and generates the first signal ΔR in response to the rotation R. The electronic device 50 receives the first signal ΔR, the second signal ΔL, and processes the first and second signals (ΔR, ΔL) to initiate an action.

In another embodiment of the present invention, also illustrated in FIGS. 5 and 6, the multifunction pointing device 10 includes a second sensor S2 positioned to detect the rotation R of the portion 5p of the shaft 5. The second sensor S2 is operative to generate a second signal ΔR in response to the rotation R. In this embodiment, the first sensor S1 detects only the translation U/D of the portion 5p of the shaft 5 and generates the first signal ΔL in response to the translation U/D. The electronic device 50 receives the first signal ΔL, the second signal ΔR, and processes the first and second signals (ΔL, ΔR) to initiate an action.

Therefore, in the above two embodiments, either the first sensor S1 detects only the translation U/D and generates the first signal ΔL and the second sensor S2 detects only the rotation R and generates the second signal ΔR, or the first sensor S1 detects only the rotation R and generates the first signal ΔR and the second sensor S2 detects only the translation U/D and generates the second signal ΔL.

Although the entire pointing implement 1 is rotated and translated, the second sensor S2 detects only the rotation R and/or translation U/D of the portion 5p of the shaft 5 that is within a second sensor range E2 of the second sensor S2. That is, so long as the portion 5p of the shaft 5 is within the second sensor range E2, then the rotation R and/or the translation U/D of the pointing implement 1 can be detected by the second sensor S2.

In FIG. 6, the translation U/D can be an up and/or down motion (i.e. a substantially linear motion along the axis L) of the pointing implement 1 in the holster H; whereas, the rotation R can be a clockwise CW and/or a counter clockwise CCW motion of the pointing implement 1 in the holster H.

In FIGS. 5 and 6, the multifunction pointing device 10 can include a third sensor S3 that is positioned to detect a movement of the pointing implement 1 from a rest position in the holster H (i.e. from the position of FIG. 5 to the position of FIG. 6). The third sensor S3 is operative to generate a first motion signal ΔT in response to the movement from the rest position. The electronic device 50 receives the first motion signal ΔT, processes the first motion signal ΔT, and initiates a first motion action in response to the first motion signal ΔT. The first motion signal ΔT can be a toggle signal that has two states. A first state to indicate a movement from the rest position (i.e. from the position of FIG. 5 to the position of FIG. 6) and a second state to indicate a return of the pointing element 1 to the rest position (i.e. from the position of FIG. 6 to the position of FIG. 5) as will be described in detail below. The rest position can be arbitrarily selected; however, in FIG. 5, the rest position is illustrated as the tip 3 being at a bottom most position in the holster H. If the pointing implement 1 does not include a tip 3 (see FIG. 7c), then the rest position can be a distal end of the shaft 5 positioned at the bottom of the holster H. FIG. 7a is another example of when the pointing implement 1 is at the rest position; whereas, FIG. 7b is an example of when the pointing implement 1 is not at the rest position.

In FIG. 6, when the pointing implement 1 is moved from the rest position, an exposed portion 5e of the shaft 5 is outside of the holster H and can be gripped by the fingers of a user (not shown) to effectuate the translation U/D and/or the rotation R of the pointing implement 1. A remainder of the pointing implement 1 is still positioned in the holster H so that the portion 5p can be sensed by the first and/or second sensors (S1, S2) and the portion 5p is within a combined effective sensor range E of both the first and second sensors (S1, S2). That is, E comprises both E1 and E2.

It should be noted that the combined effective sensor range E requires that the portion 5p must be within the range E so that both the first and second sensors (S1, S2) will detect the translation U/D and the rotation R of the pointing implement 1 in the holster H. If for example, the tip 3 (or the distal end of the shaft 5) is positioned so that it is in between the first and second sensors (S1, S2), then the second sensor S2 will no longer be able to detect the portion 5p because the portion 5p is outside the second sensor range E2 (see a point p1 in FIG. 5), although the first sensor S1 may still be able to detect the portion 5p.

Similarly, if the tip 3 (or the distal end of the shaft 5) is positioned so that it is outside the first sensor range E1 of the first sensor S1 and therefore outside both the first and second sensor ranges E1 and E2 (see a point p2 in FIG. 5), then both the first sensor S1 and the second sensor S2 will not be able to detect the portion 5p. Accordingly, the combined effective sensor range E represents a region within the holster H were the portion 5p must be present so that both the first and second sensors (S1, S2) can detect the translation U/D and rotation R of the shaft 5.

In FIGS. 5 and 6, the aforementioned first motion action can be any action that can be implemented in hardware, software, or a combination of hardware and software and includes but is not limited to powering up the electronic device 10, awakening the electronic device 50 from a standby state (e.g. a sleep mode), activating the first sensor and second sensors (S1, S2), causing an algorithm (e.g. a software program) to execute on the electronic device 50, turning on a backlight that illuminates the display 20 (see 175 and 175a in FIG. 15), causing the electronic device 50 to transmit information, causing the electronic device 50 to receive information, causing the electronic device 50 to transceive information (i.e both transmit and receive), causing the electronic device 50 to update information, causing the electronic device 50 to synchronize information, and causing information to be displayed on the display 20.

Examples of transmitting, receiving, and transceiving information include but are not limited to an email communication, uploading/downloading data or files, sending or receiving digital photographs or images, communications with a local area network (LAN) or a wireless network, just to name a few. For instance, if the electronic device 50 is a digital camera, then the first motion action can cause the electronic device 50 to download all images captured in a memory of the digital camera. If the electronic device 50 is a personal digital assistant (PDA), then the first motion action can cause the electronic device 50 to start an email program to check an email account for new email messages and also cause the electronic device 50 to send email messages that were previously drafted and stored in the PDA.

As an example of updating or synchronizing data, if the electronic device 50 is a PDA that can be docked with a cradle connected with a personal computer (PC), then the first motion action can cause the electronic device 50 to synchronize its files with files stored on the PC.

In one embodiment of the present invention, the third sensor S3 is operative to generate a second motion signal ΔT when the pointing element 1 is returned to the rest position (i.e. from the position of FIG. 6 to the position of FIG. 5). The electronic device 50 receives and processes the second motion signal ΔT and initiates an action in response to the second motion signal ΔT.

The second motion action can be any action that can be implemented in hardware, software, or a combination of hardware and software and includes but is not limited to powering down (i.e. turning it off) the electronic device 50, placing the electronic device 50 in a standby state (e.g. a sleep mode), de-activating the first and/or second sensors (S1, S2), halting execution of an algorithm (e.g. a software program) on the electronic device 50, turning off a backlight that illuminates the display 20 (see 175 and 175a in FIG. 15), causing the electronic device 50 to terminate a transmission of information, causing the electronic device 50 to terminate a reception of information, causing the electronic device 50 to terminate a transceiving of information, causing the electronic device 50 to update information, causing the electronic device 50 to synchronize information, and terminating a display of information on the display 20.

The third sensor S3 can be implemented using a variety of technologies including but not limited to a switch, a micro switch, a hall effect switch, or a photo-switch, for example. The first motion signal ΔT can be a positive electrical pulse and the second motion signal ΔT can be a negative electrical pulse so that one signal line can be used for both the first and second motion signals ΔT. On the other hand, the first and second motion signals ΔT can be on separate signal lines (not shown). The first and second motion signals ΔT can also be represented by a presence of a signal and an absence of a signal. For instance, +5.0 volts for a signal and 0.0 volts for no signal.

Figure 7G:
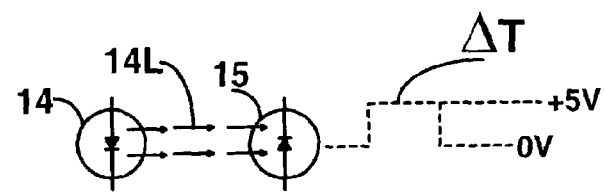
FIG. 7*g* is a schematic depicting a photo-switch for implementing a third sensor according to the present invention.
Figure 7G:
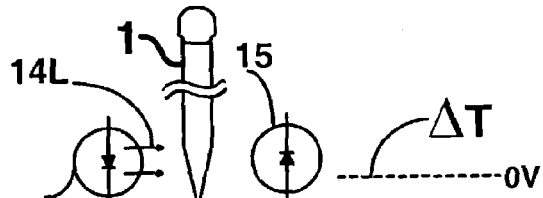
Figure 7G:
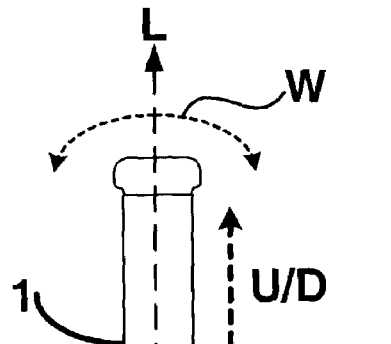
Figure 7A:
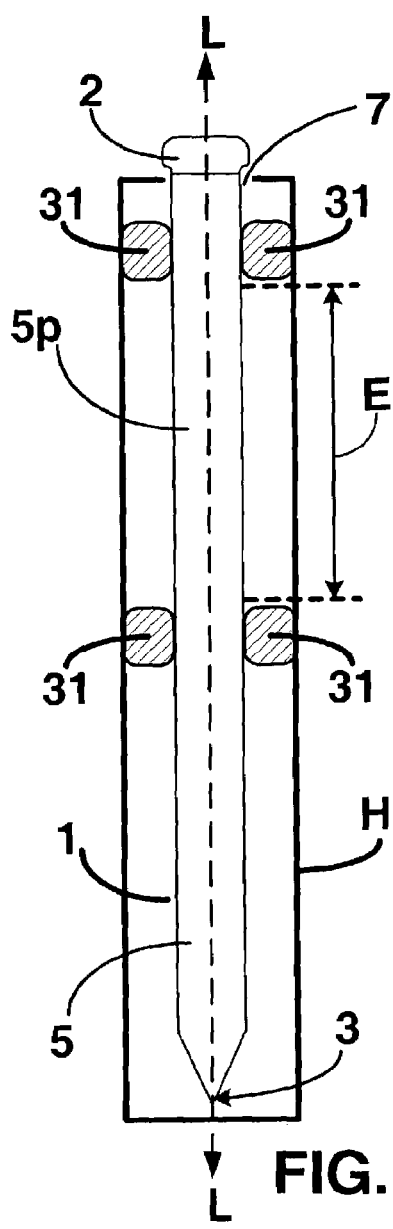
FIGS. 7*a* and 7*b* are schematic views depicting an alignment element according to the present invention.
Figure 7B:
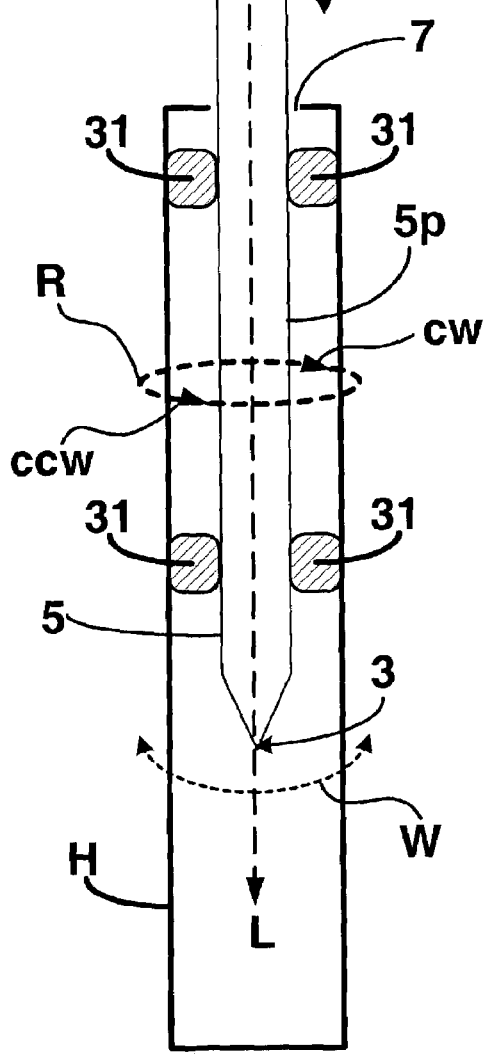

For example, in FIG. 7g, if a photo-switch comprising a light source, such as a light emitting diode 14 (LED) and a light receiver, such as a photo-diode 15, are used for the third sensor S3, then when the pointing implement 1 is in the rest position, the tip 3 or the shaft 5 can block light 14L from the LED 14 so that no signal ΔT is generated by the photo-diode 15. Moving the pointing implement 1 from the rest position allows the light 14L from the LED 14 to strike the photo-diode 15 and a signal ΔT is generated by the photo-diode 15. Conversely, returning the pointing implement 1 to the rest position blocks the light 14L from the LED 14 causing the signal ΔT from the photo-diode 15 to cease, thereby indicating a return of the pointing implement 1 to the rest position.

In one embodiment of the present invention, as illustrated in FIGS. 7a and 7b, the multifunction pointing implement 10 includes at least one alignment element 31 that is connected with the holster H and is in contact with the shaft 5 and is operative to substantially align the pointing implement 1 with the axis L when the pointing implement 1 is moved in the translation U/D along the axis L and is moved in the rotation R about the axis L. The alignment element 31 prevents the pointing implement 1 from wobbling W about the axis L when the pointing implement 1 is griped by the hand of a user. By preventing the wobbling W, false signals from the first and second sensors (S1, S2) can be eliminated or reduced and the pointing implement 1 can move smoothly in the rotation R and the translation U/D in the holster H. Preferably, two spaced apart alignment element 31 are used to prevent the wobbling W.

In FIG. 7c, the alignment elements 31 can be positioned inside the holster H. If the pointing implement 1 and the holster H have a circular cross-sectional profile (along a line c—c of FIG. 7c) as depicted in FIG. 7d, then the alignment elements 31 can also have a circular cross-sectional profile. For example, the alignment element 31 can include a circular opening 31a through which the shaft 5 can pass. The circular opening 31a should have a diameter that allows for easy insertion and removal of the pointing implement 1 while still maintaining the substantial alignment with the axis L. Suitable materials for the alignment element include but are not limited to metals, plastics, ceramics, rubber, and glass.

In another embodiment of the present invention, as illustrated in FIG. 7c, the multifunction pointing implement 10 includes at least one resistance element 32 connected with the holster H and in contact with the shaft 5. The resistance element 32 is operative to resist movement of the pointing implement 1. The movement of the pointing implement 1 can be resisted in a translational direction along the axis L (e.g. U/D), a rotational direction (e.g. R) about the axis L, and a combination of translational and rotational directions (e.g. U/D and R) about the axis L.

The resistance element 32 can be positioned in the holster H and can include a circular cross-sectional profile (along a line b—b of FIG. 7c) and a circular opening 32a through which the pointing implement 1 is inserted (see FIG. 7e). The resistance element 32 applies a force f against the shaft 5 that resists movement of the pointing implement 1 through the circular opening 32a. The force f need only be of sufficient magnitude to allow the pointing implement 1 to move in translation U/D and rotation R while providing tactile feedback to a user gripping the pointing implement 1 and while preventing the pointing implement 1 from moving when the user is not gripping the pointing implement 1. One or more of the resistance elements 32 can be used and the resistance element 32 can be used in conjunction with the one or more of the alignment elements 31.

Moreover, if the electronic device 50 is held upside down or at an angle, then the resistance element 32 prevents the pointing implement 1 from falling out of the holster H. The resistance element 32 can also prevent unintended actions from being initiated by the electronic device due to movement and/or vibrations acting on the electronic device 50 that can jar the pointing implement 1 thus causing the first and/or second sensors (S1, S2) to generate spurious signals (ΔL, ΔR). Suitable materials for the resistance element 32 include but are not limited to felt, rubber, silicon rubber, nylon, metals, glass, and plastics.

For example, those materials can be sized so that they have a diameter that is equal to or slightly less than an outside diameter of the shaft 5 of the pointing implement 1 so that the shaft 5 is engaged by the material of the resistance element 32 and results in the force f acting on the shaft 5.

As another example, the force f can be a static and a dynamic friction force that provides tactile feedback while also preventing the pointing implement 1 from moving in the holster H when the users is not handling the pointing implement 1. An O-ring (rubber or silicone rubber) is one example of a material for the resistance element 32.

In yet another embodiment of the present invention, as illustrated in FIG. 7f, the multifunction pointing implement 10 includes at least one alignment-resistance element 33 connected with the holster H and in contact with the shaft 5. The alignment-resistance element 33 is operative to substantially align the pointing implement 1 with the axis L in the manner as described above for the alignment element 31. The alignment-resistance element 33 is also operative to resist movement of the pointing implement 1 in the manner described above for the resistance element 32. One or more of the alignment-resistance element 33 can be used and the alignment-resistance element 33 can be positioned in the holster H in the manner described above for the alignment element 31 and the resistance element 32 (see FIG. 7c). The alignment-resistance element 33 can have a circular cross-sectional profile and can include a circular opening 33a through which the pointing implement 1 is inserted as depicted in FIG. 7f.

Consequently, the alignment-resistance element 33 performs the functions of aligning the pointing implement 1 with the axis L and resisting movement of the pointing implement 1 along the axis L. Suitable means for the alignment-resistance element 33 included but are not limited to those set fourth above for the alignment and resistance elements (31, 32).

The alignment-resistance element 33 applies a force f against the shaft 5 that resists movement of the pointing implement 1 through the circular opening 33*a*. The force f need only be of sufficient magnitude to allow the pointing implement 1 to move in translation U/D and rotation R while providing tactile feedback to a user gripping the pointing implement 1 and while preventing the pointing implement 1 from moving when the user is not gripping the pointing implement 1. As described above, the force f can be a static and a dynamic friction force that provides tactile feedback while also preventing the pointing implement 1 from moving in the holster H when the users is not handling the pointing implement 1.

In FIG. 7*c*, the multifunction pointing implement 10 can include a stop 3*s* connected with the holster H and a keeper 3*k* connected with the pointing implement 1. The keeper 3*k* is operative to engage with the stop 3*s* to prevent the pointing implement 1 from being removed (i.e. un-holstered) from the holster H. In FIG. 7*c*, the keeper 3*k* has a diameter that is larger than on opening in the stop 3*s* and is also larger than a diameter of the shaft 5. As a result, when the keeper 3*k* is urged into contact with the stop 3*s*, the pointing implement 1 cannot be removed from the holster H and its motion along the axis L is halted. The aforementioned alignment element 31, the resistance 32, the alignment-resistance element 33, and the aperture 7 can also serve as the stop 3*s*.

Figure 4B:
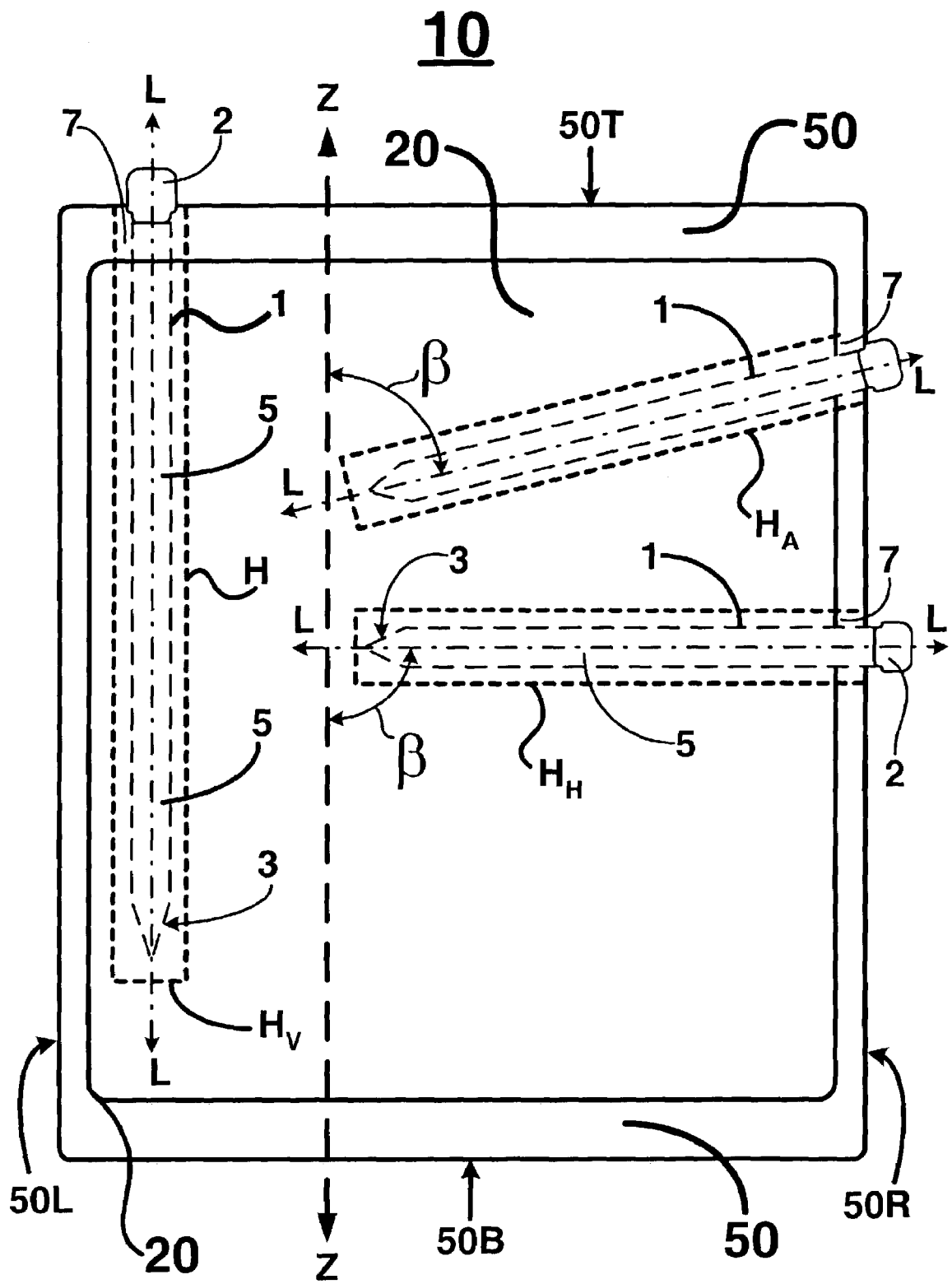
FIG. 4*b* is a schematic view of a multifunction pointing device and depicts variations in orientation and placement of a holster and a pointing implement according to the present invention.

Although the holster H is illustrated as being positioned on a right hand side of the electronic device 50 of FIG. 4*a*, the holster H can be positioned anywhere on the electronic device 50. Moreover, although the electronic device 50 of FIG. 4*b* is similar in appearance to a PDA, the electronic device 50 can be any device and is not limited to the devices illustrated herein. For example, in FIG. 4*b*, the electronic device 50 can be a tablet portable computer. Moreover, the holster H can have a position on the electronic device 50 including but not limited to a left hand side 50L (see FIG. 4*b*), a right hand side 50R (see FIG. 4*a*), a top side 50T, and a bottom side 50B.

As illustrated in FIG. 4*b*, the holster H need not have a vertical orientation with respect to the electronic device 50. In FIG. 4*b*, an arbitrary device axis Z is selected to illustrate variations in orientation of the holster H. A holster $H_v$ can have a vertical orientation relative to the device axis Z as depicted on the left hand side 50L of FIG. 4*b* and on the right hand side 50R of FIG. 4*a*. The vertical orientations can include configurations in which the pointing implement 1 enters the holster $H_v$ from the bottom side 50B (not shown). In that configuration, the above mentioned resistance element 32 or alignment-resistance element 33 can be used to prevent the pointing implement 1 from falling out of the holster $H_v$ or moving in the holster $H_v$ due to a force of gravity acting on the pointing implement 1. Alternatively, the keeper 3*k* and stop 3*s* can be used to prevent the pointing implement 1 from falling out of the holster H.

A holster $H_H$ can have a horizontal orientation relative to the device axis Z as depicted in FIG. 4*b*. If the horizontal orientation is used, then the pointing implement 1 can be inserted into and removed from the holster $H_H$ through the left hand or right hand sides (50L, 50R) of the electronic device 50. A holster $H_A$ can have an angular orientation relative to the device axis Z as denoted by the angle β of FIG. 4*b*. For the horizontal orientation $H_H$, the angle β is about 90 degrees.

One advantage of the multifunction pointing device 10 of the present invention is that it allows for variations in position and orientation of the holster H and pointing implement 1 that can accommodate the ergonomic needs and preference of different users. For instance, a left handed user might prefer or need the holster H and pointing implement 1 to be on the left hand side 50L of the electronic device 50.

As another example, in an industrial environment where the user may be required to wear gloves, if may be easier for the user to implement scrolling or other actions using the translation U/D and rotation R motions of the pointing implement 1 while wearing the gloves than it would be if the user had to completely remove the pointing implement 1 from the holster H to effectuate a touching of the tip 3 with the display 20 (i.e. a touch-sensitive display). Moreover, because the user is wearing gloves, it would be inconvenient to remove the glove in order to use a finger on the display 20.

Figure 8A:
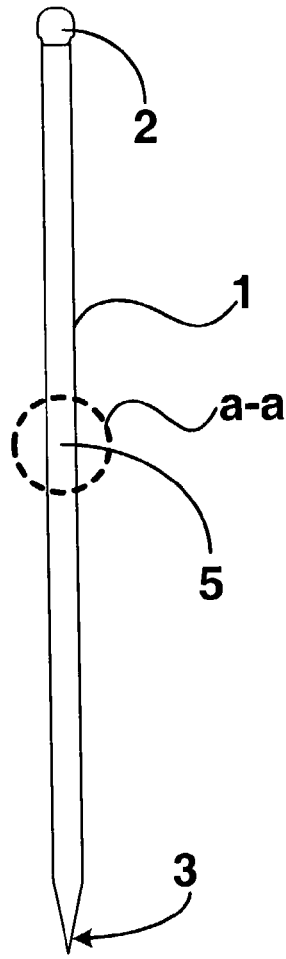
FIG. 8a is a schematic view of a pointing implement including a patterned surface on a shaft thereof according to the present invention.
Figure 8B:
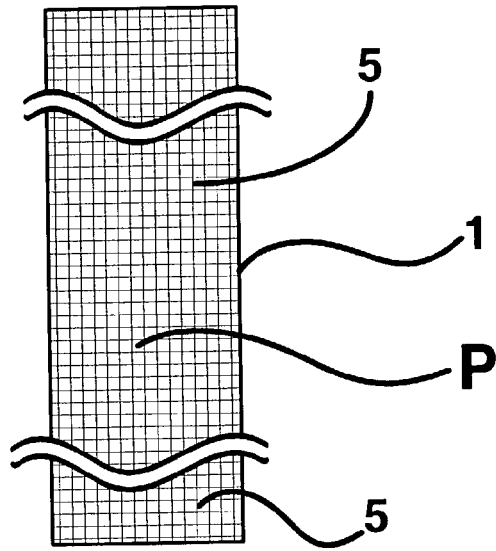
FIG. 8b is a detailed view of section a—a of FIG. 8a and depicts in greater detail an example of a patterned surface of a shaft according to the present invention.
Figure 8C:
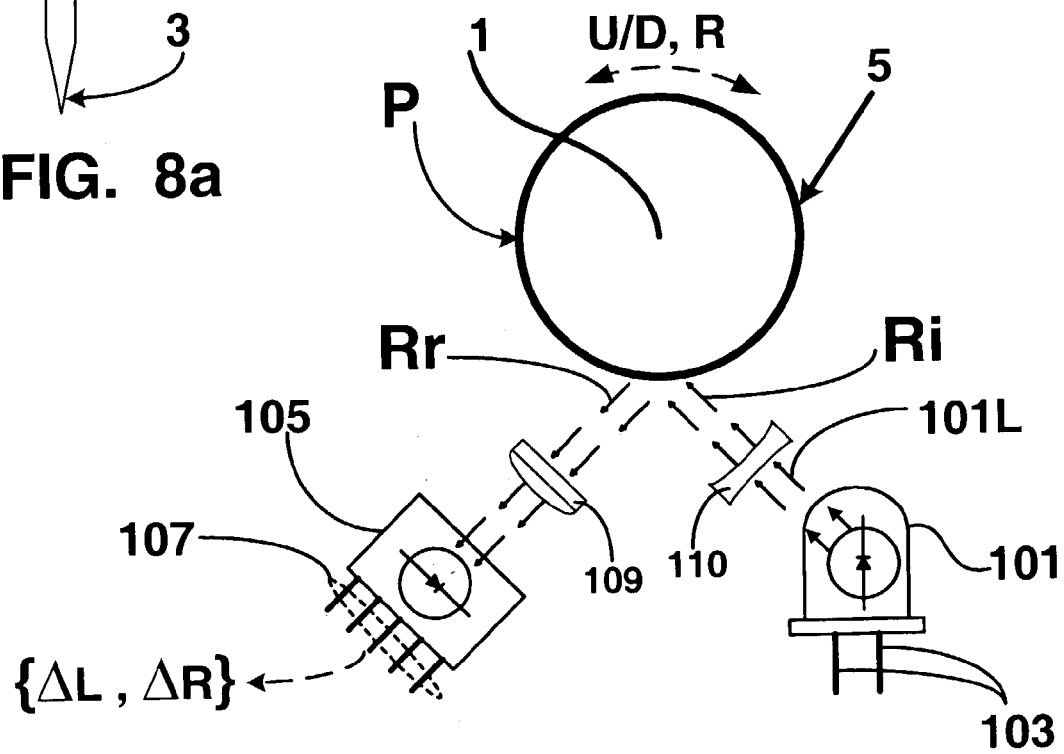
FIG. 8c is a schematic of an optical sensor for sensing a translation and/or a rotation of a shaft of a holstered pointing implement according to the present invention.

The first and second sensors (S1, S2) can be implemented using motion detection and tracking electronics that are well understood in the electronics and pointing device art. For example, in FIG. 8*a*, the pointing implement 1 can include a shaft 5 that has a patterned or textured surface. In FIG. 8*b*, a section a—a of the shaft 5 is shown in greater detail. The shaft 5 includes a pattern P thereon that can include but is not limited to a regular pattern (e.g. a fine grid), an irregular pattern, a surface with a predetermined texture, a surface with variations in reflectivity, a speckled surface, and a surface with variations in color. In FIG. 8*c*, an electro-optical sensor includes a light source 101 for generating a light beam 101L and a light sensor 105 for detecting the light beam 101L. The light beam 101L comprises an incident radiation Ri on the shaft 5. The incident radiation Ri reflects off of the shaft 5 as a reflected radiation Rr and the reflected radiation Rr is detected by the light sensor 105. As the pointing implement 1 is translated and/or rotated (U/D, R), the pattern P causes the reflected radiation Rr to vary (i.e. the reflected radiation Rr is modulated) and an output of the light sensor 105 changes in response to those variations in the reflected radiation Rr.

For example, the light source 101 can be a LED and the light sensor 105 can be a PIN diode. Electrical power can be supplied by the electrical device 50 to pins 103 of the light source 101 and the first and second signals (ΔL, ΔR) can be electrically communicated to the electronic device 50 via one or more pins 107 on the light sensor 105. Optionally, one or more optical elements (109, 110), such as lenses for example, can be used to focus and collimate the incident and reflected light (Ri, Rr).

The electro-optical sensor of FIG. 8*c* works in a manner similar to that of an optical mouse, wherein the optical mouse is placed on a patterned mouse pad or other patterned surface. The optical mouse generates a light beam that is reflected off of the patterned surface. A relative motion between the optical mouse and the patterned surface causes the reflected light beam to be modulated in intensity. A signal generated by the modulated light is processed to convert the relative motion into an action such as moving a cursor or the like. A software program can be used to process the signal from the mouse.

Figure 9A:
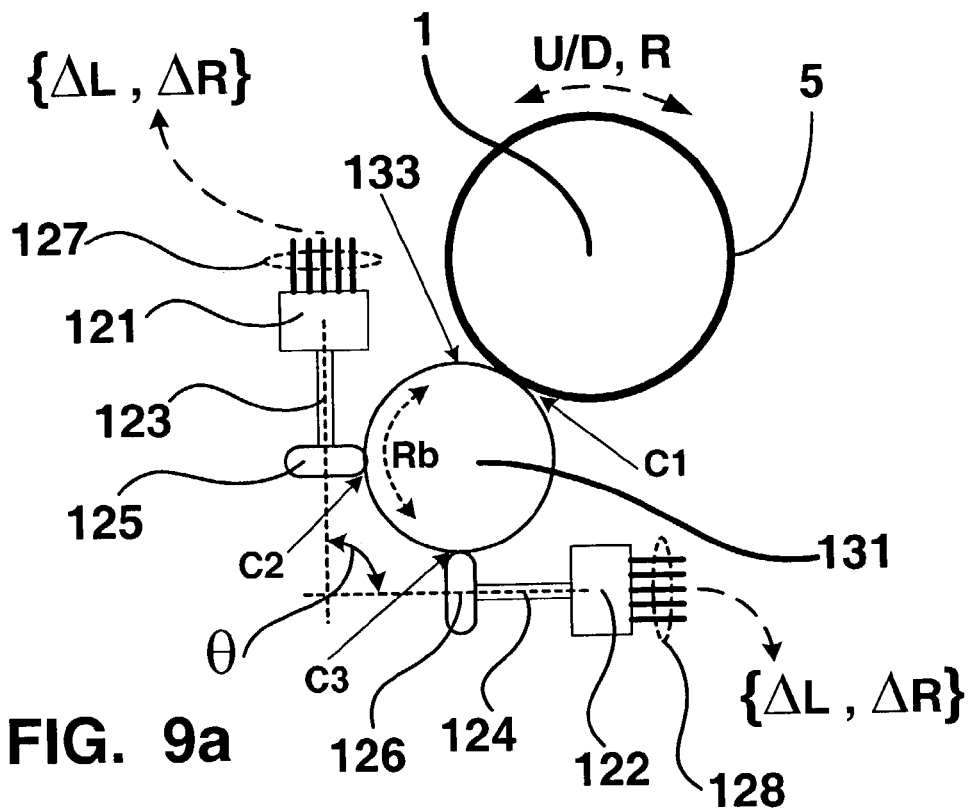
FIG. 9a is a schematic depicting an electro-mechanical sensor for sensing a translation and/or a rotation of a shaft of a holstered pointing implement according to the present invention.

As another example, in FIG. 9*a*, the first and/or second sensors (S1, S2) can be implemented using optical encoder technology such as the kind used for a track ball mouse. The shaft 5 is in contact with a track ball 133 at a contact point C1. The translation and/or rotation (U/D, R) of the shaft 5 is mechanically communicated to the track ball 133 as a motion Rb.

In FIG. 9*a*, a first optical encoder 121 includes a wheel 125 that is in contact with the track ball 133 at a contact point C2 so that the motion Rb turns a shaft 123 of the encoder 121 and signals are generated at pins 127. The signals from pins 127 can be the first and/or the second signals (ΔL, ΔR). Similarly, a second optical encoder 122 includes a wheel 126 that is in contact with the track ball 133 at a contact point C3 so that the motion Rb turns a shaft 124 of the encoder 122 and signals are generated at pins 128. The signals from pins 128 can be the first and/or the second signals (ΔL, ΔR). Typically, the first and second optical encoders (121, 122) are positioned at an orthogonal angle θ (e.g., θ=90 degrees) relative to each other.

One of the encoders can detect only the translation U/D and generate the signal ΔL, and the other encoder can detect only the rotation R and generate the signal ΔR. The track ball 131 can be positioned in a socket (not shown) that is connected with the holster H and allows for the rotation Rb of the track ball 131 in response to the translation and rotation (U/D, R) of the shaft 5.

Figure 9B:
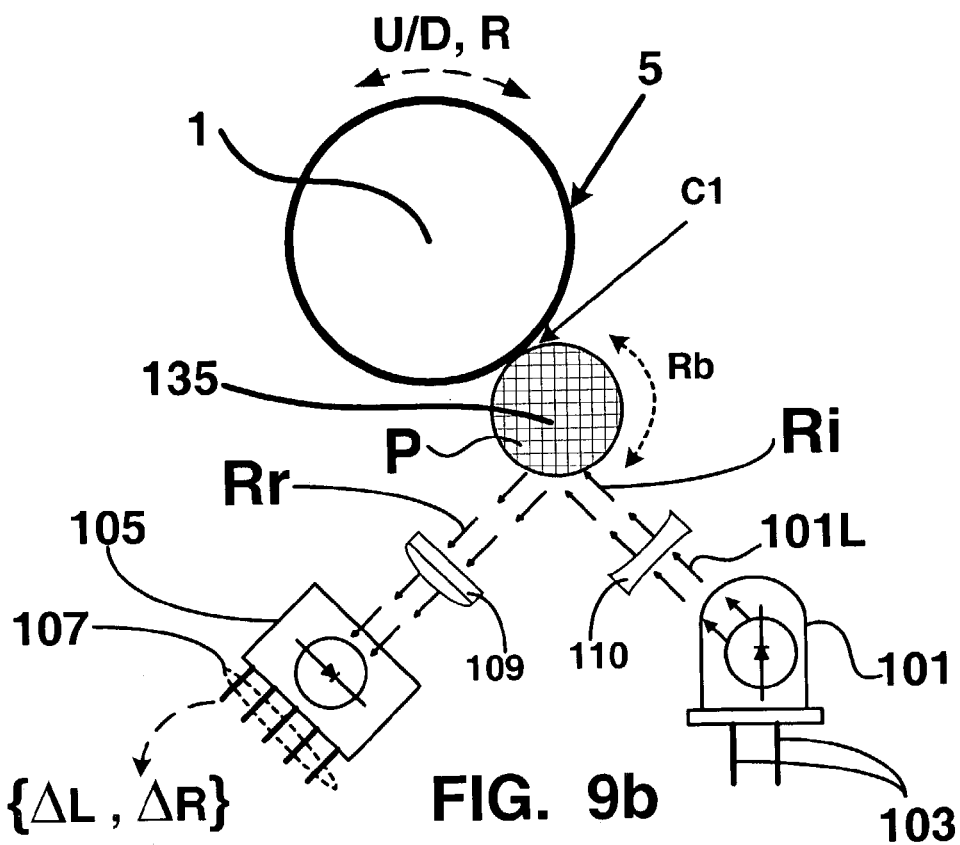
FIG. 9b is a schematic depicting an optical mechanical sensor for sensing a translation and/or a rotation of a shaft of a holstered pointing implement according to the present invention.

In FIG. 9b, as another example, the electro-optical sensor of FIG. 8c is used to detect reflected radiation from a patterned track ball 135 (that is, instead of the patterned shaft 5 of FIG. 8c). The patterned track ball 135 includes a patterned surface P. The shaft 5 is in contact with the patterned track ball 135 at a contact point C1 and the translation and/or rotation (U/D, R) is mechanically communicated to the patterned track ball 135 causing the patterned track ball 135 to rotate Rb. As the patterned track ball 135 rotates Rb, the incident radiation Ri is reflected off the patterned surface P as the reflected radiation Rr which is modulated by the patterned surface P as described above in reference to FIG. 8c. As a result, the first and second signals (ΔL, ΔR) are generated by the light sensor 105. The patterned track ball 135 can be a sphere with a speckled surface such as the type used by Logitech® Inc. in some of its track ball mouse products.

Figure 9C:
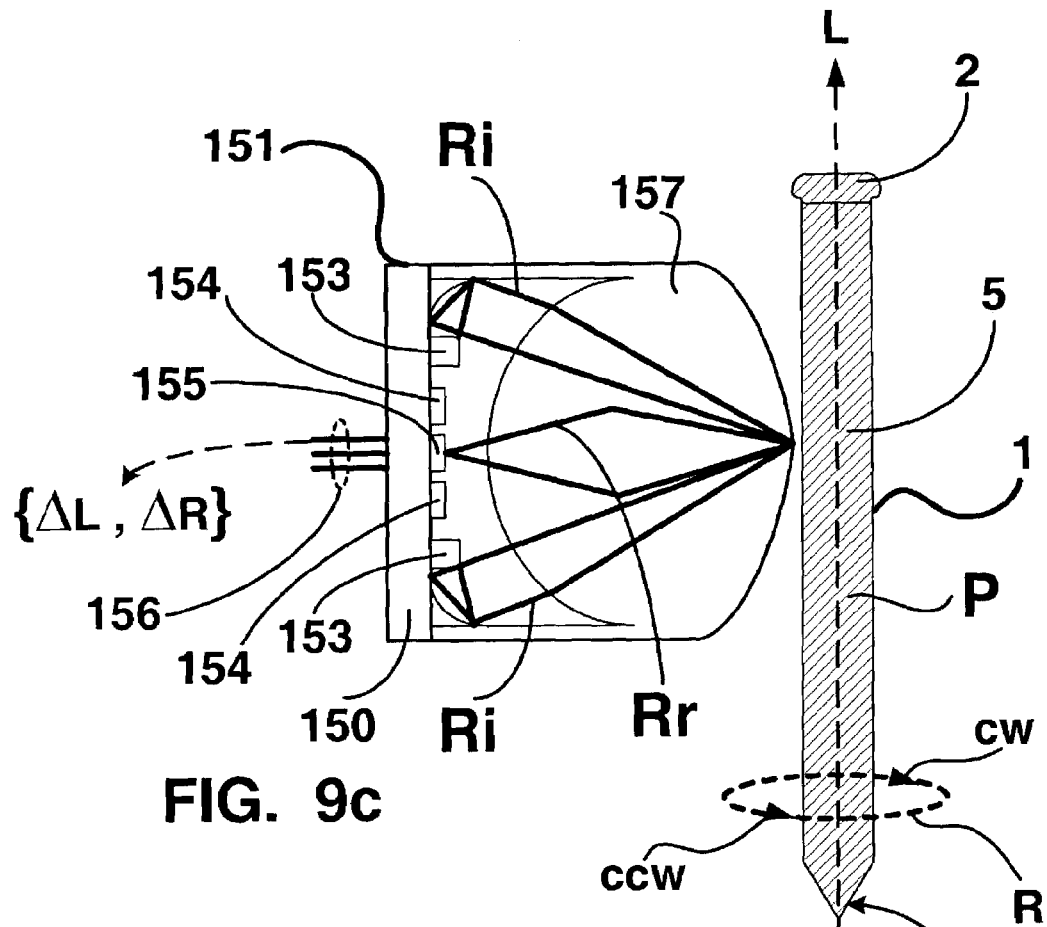
FIG. 9c is a schematic depicting an optical sensor for sensing a translation and/or a rotation of a shaft of a holstered pointing implement according to the present invention.

As yet another example, in FIG. 9c, the first and/or the second sensor (S1, S2) can be implemented using a laser-based scrolling device 151 such as the type developed by the Phillips® Centre for Industrial Technology. The laser-based scrolling device 151 includes a laser light source 153 mounted on a substrate 150. The laser light source 153 generates a beam of incident laser radiation Ri that is focused by a lens 157 on the shaft 5 of the point implement 1. Preferably, the shaft 5 is patterned P as described above. The radiation Ri is reflected off of the shaft 5 as a reflected radiation Rr and is focused by the lens 157 on light sensors 155. A signal from the light sensors 155 are processed by electronics 154 that generate the signals (ΔL, ΔR) at pins 156. The lens 157 need not be in direct contact with the shaft 5. The translation and/or rotation (U/D, R) of the shaft 5 cause the reflected radiation Rr to be modulated with a resulting change in the signals (ΔL, ΔR).

Figure 9D:
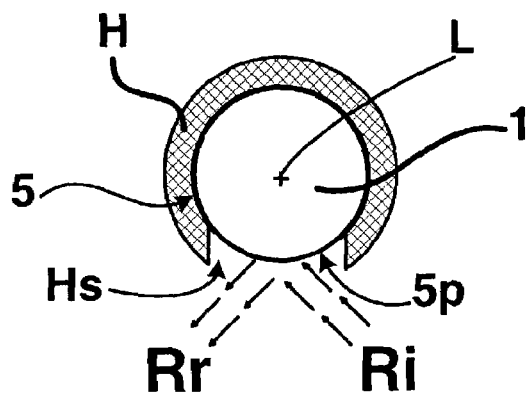
FIGS. 9d and 9e are cross-sectional views of a holster with an aperture therein to facilitate a sensing of a translation and/or a rotation of a shaft of a holstered pointing implement according to the present invention.

In FIG. 9d, the holster H can include a sensor aperture Hs through which the incident radiation Ri can illuminate the shaft 5 and be reflected off the shaft as the reflected radiation Rr and be detected by the light sensors of FIGS. 8c and 9c. The aperture Hs can be a through hole in the holster H or it can be an optically transparent window that is optically transparent to a wavelength of light from the light sources (103, 153).

Figure 9E:
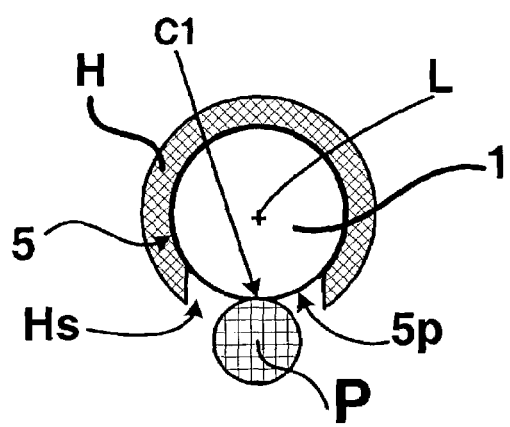

In FIG. 9e, the holster H can include a sensor aperture Hs through which the track balls (133, 135) can be urged into contact with the shaft 5 so that the translation and/or rotation (U/D, R) of the shaft 5 can be mechanically communicated to the track balls (133, 135). The track ball can be patterned P as illustrated in FIG. 9e for use in the sensor described above in reference to FIG. 9b.

Figure 10:
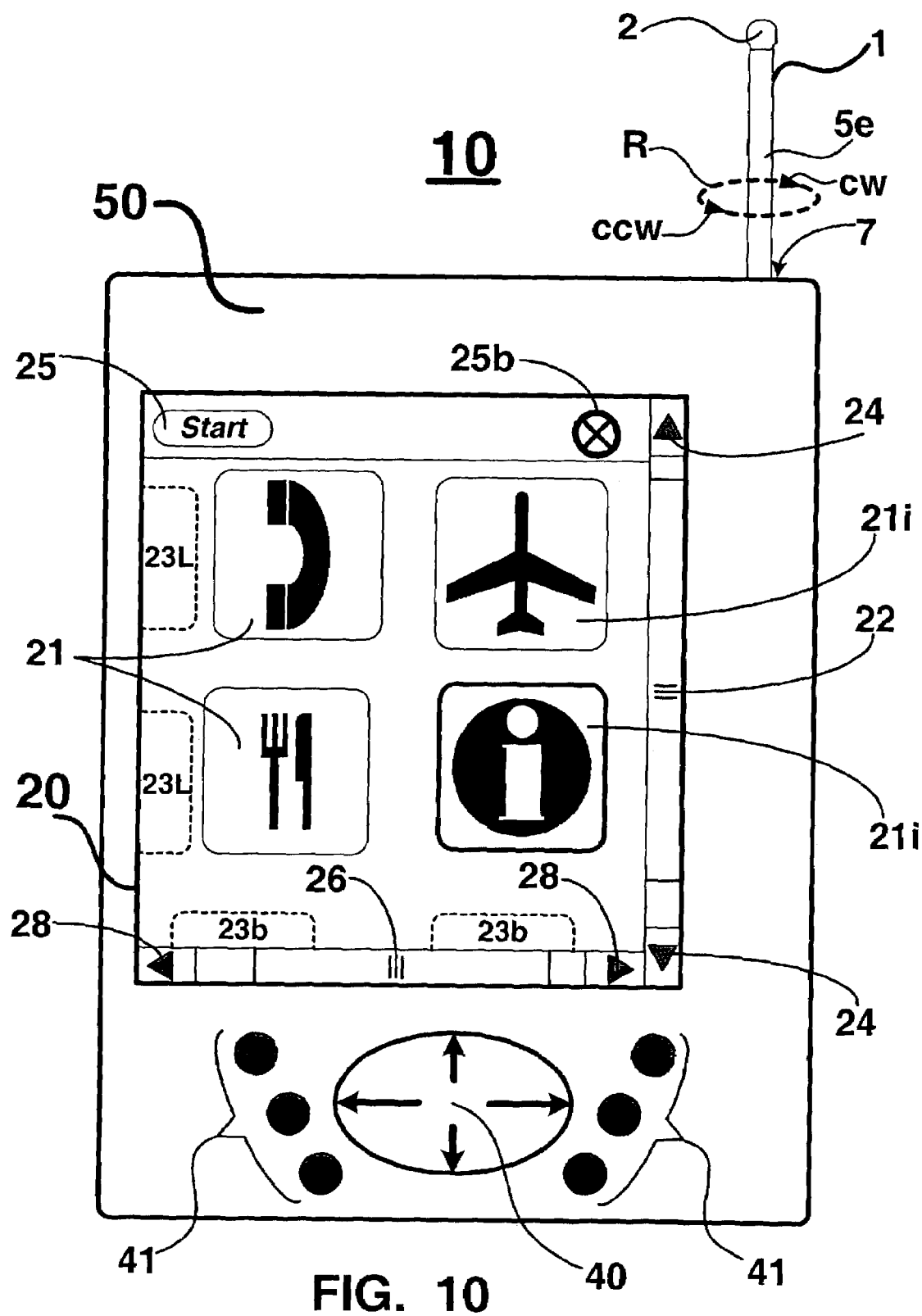
FIGS. 10 and 11 are schematic views depicting a translation and/or rotation of a holstered pointing implement to manipulate data displayed on a display according to the present invention.
Figure 11:
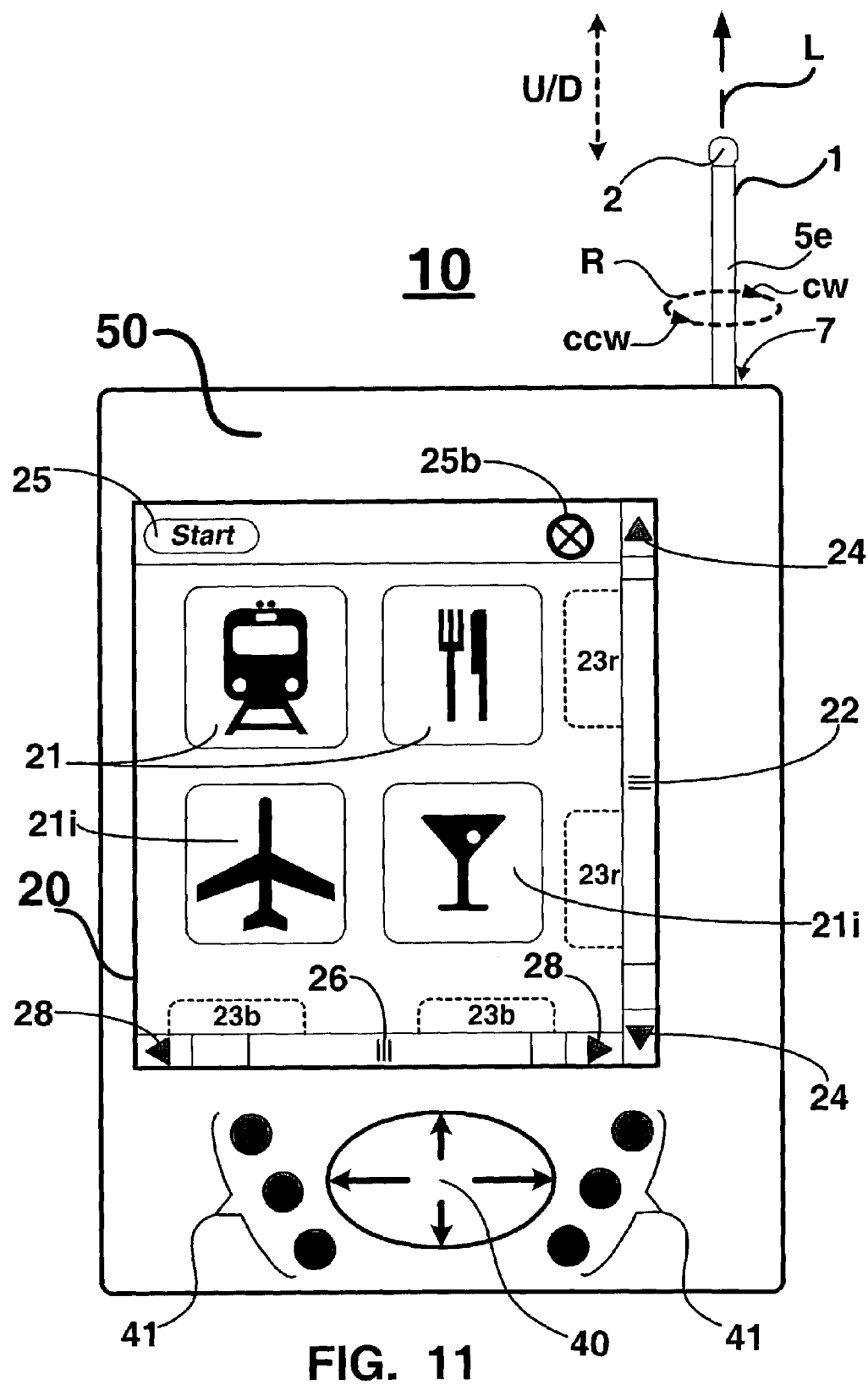

In FIGS. 4a, 10, and 11, operation and advantages of the multifunction pointing device 10 of the present invention will be described by way of illustration. In FIG. 4a, it is desired to bring two off-screen icons 23r (at the right side of the display 20) into full view on the display 20 of the electronic device 50. Instead of completely removing the pointing implement 1 from its holster H and using the pointing implement 1 as a stylus to activate the scroll bars (22, 26), the pointing implement 1 remains holstered in the holster H and the exposed portion 5e is grasped by the hand of a user. The pointing implement 1 is then rotated R about the axis L in the clockwise direction CW to scroll the off-screen icons 23r into full view on the display 20 as denoted by the on-screen icons 21i (an airplane and an i) of FIG. 10. As a result, the icons 21 (an envelope and a train) of FIG. 4a are scrolled off-screen (see icons 23L of FIG. 10) and the phone and knife/fork icons 21 have moved over to the left by the scrolling action.

Similarly, in FIG. 4a if it is desired to scroll the off-screen icons 23b (at the bottom of the display 20) into full view on the display 20. That action is accomplished by translating U/D the pointing implement 1 in a up direction along the axis L to scroll the off-screen icons 23b into full view. As a result, the icons 21 (an envelope and a phone) are scrolled off-screen and the icons 21 (a train and a knife & fork) move up on the screen to make room for the icons 21i that have scrolled into view because of the translational movement of the pointing implement 1.

Accordingly, when an entire screen of information or data cannot be displayed at one time on the display 20, the multifunction pointing device 10 allows for the scrolling of the screen to bring off-screen images into view.

Figure 12:
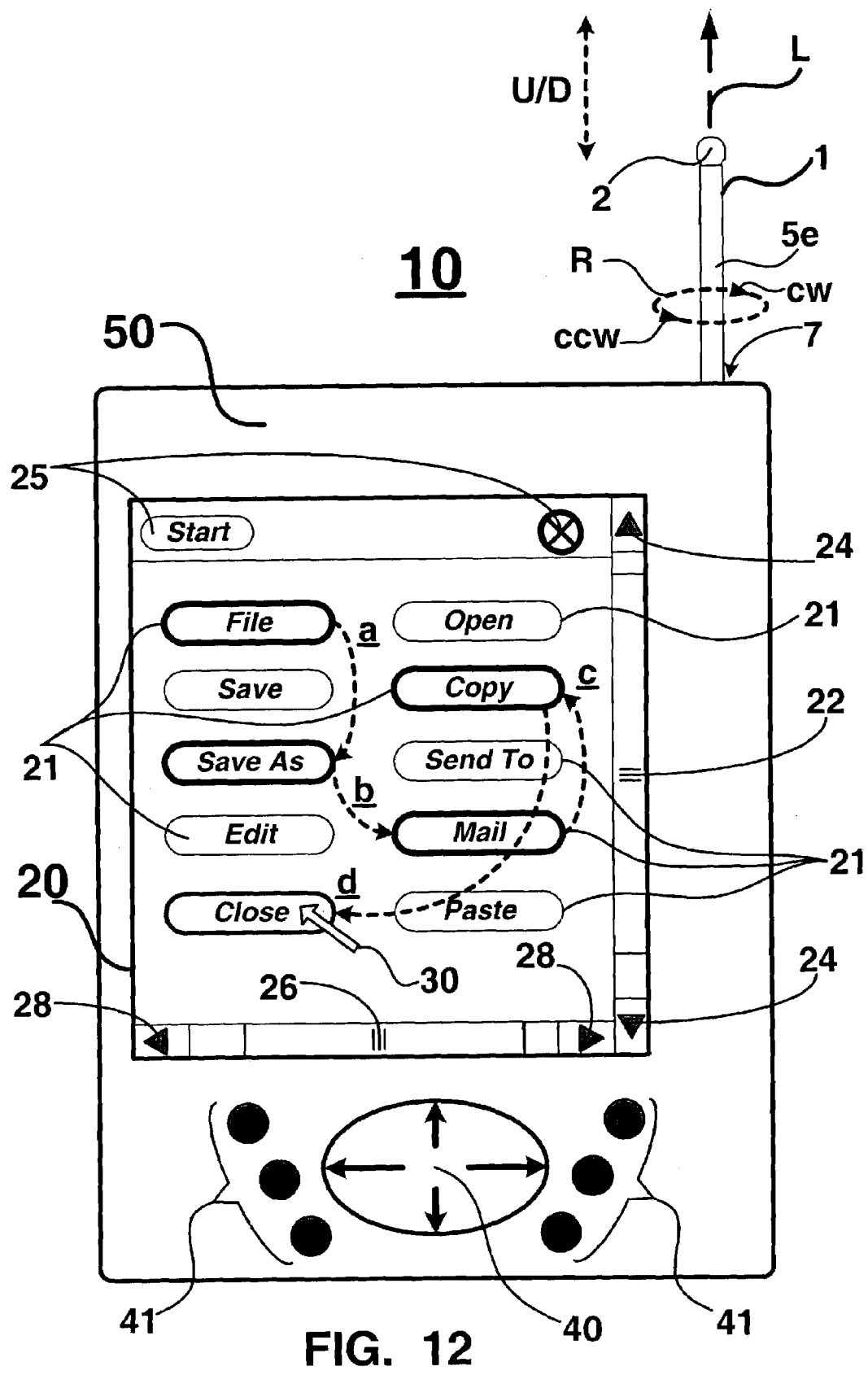
FIG. 12 is a schematic view depicting a translation and/or rotation of a holstered pointing implement to navigate among various menu options displayed on a display according to the present invention.

As another example of the usefulness of the multifunction pointing device 10 of the present invention, in FIG. 12, the translation U/D and rotation R of the pointing implement 1 while still holstered in the holster H are used to move a cursor 30 on the display 20.

In FIG. 12, a plurality of menu icons 21 are displayed on the display 20. A translation U/D motion of the pointing implement 1 can be used to move the cursor 30 from the "File" menu to the "Save As" menu as denoted by a dashed arrow a. A rotation R and a translation motion U/D are then used to move the cursor 30 from the "Save As" menu to the "Mail" menu as denoted by a dashed arrow b. Another translation motion U/D is used to move the cursor 30 from the "Mail" menu to the "Copy" menu as denoted by a dashed arrow c, followed by a rotation R and a translation U/D motion to move the cursor 30 from the "Copy" menu to the "Close" menu as denoted by a dashed arrow d.

Alternatively, the above mentioned rotations and translations (U/D, R) can be used to highlight the menu icons 21 on the display 20 as denoted by the heavy outline on the icons 21 such that moving the holstered pointing implement 1 causes the icons 21 to be highlighted in the order shown by the dashed arrows from a to b to c to d.

In either case, after selecting one of the above mentioned menu icons 21 with the cursor 30 or highlighting it, the menu icon 21 can be opened by pressing the cursor pad 40 or one of the function buttons 41, for example.

Figure 13:
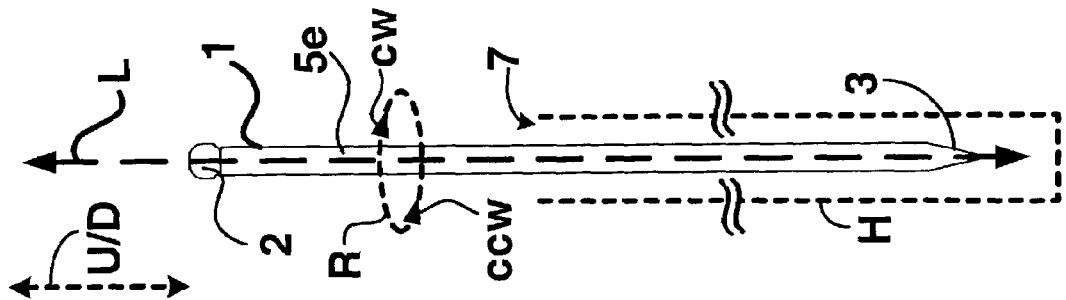
FIG. 13 is a schematic view depicting a translation and/or rotation of a holstered pointing implement to view different portions of an image displayed on a display according to the present invention.
Figure 13:
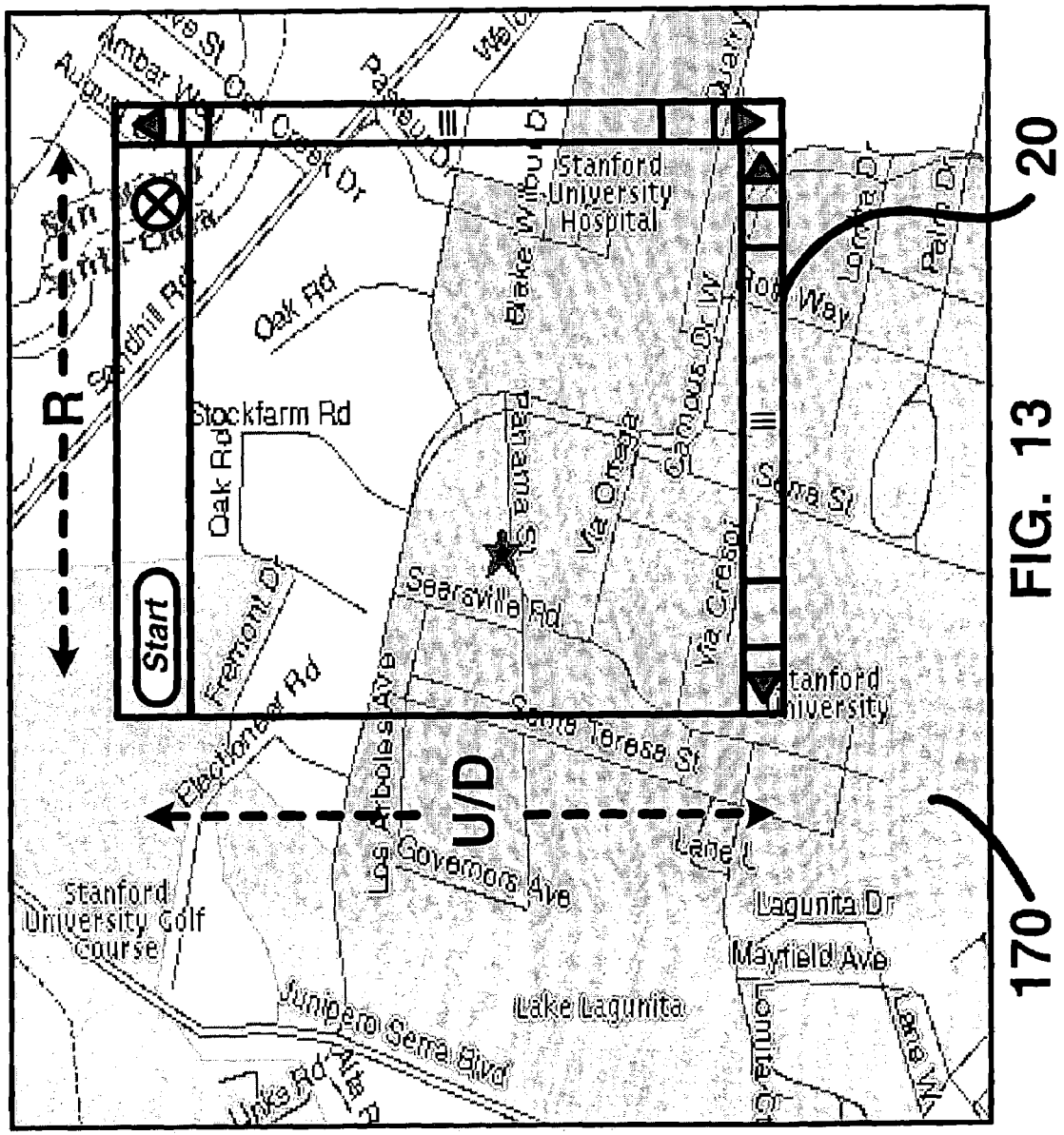

As yet another example of how the multifunction pointing device 10 can be used, in FIG. 13 an image of a map 170 is displayed on the display 20; however, the entire image of the map is to large to be displayed at one time on the display 20. Accordingly, the rotations and translations (U/D, R) of the pointing implement 1 are used to scroll various portions of the map 170 on-screen for viewing.

For instance, the map 170 may have been uploaded to the electronic device 50 from the Internet and stored in memory. Moving the pointing implement 1 from the rest position turns on the electronic device 50 and causes the map 170 to be displayed on the display 20 and the rotations and translations (U/D, R) allow the map to be scrolled over the display 20. Returning the pointing implement 1 to the rest position can turn the off the electronic device 50 or merely turn off the display 20 or its backlighting source.

Figure 14B:
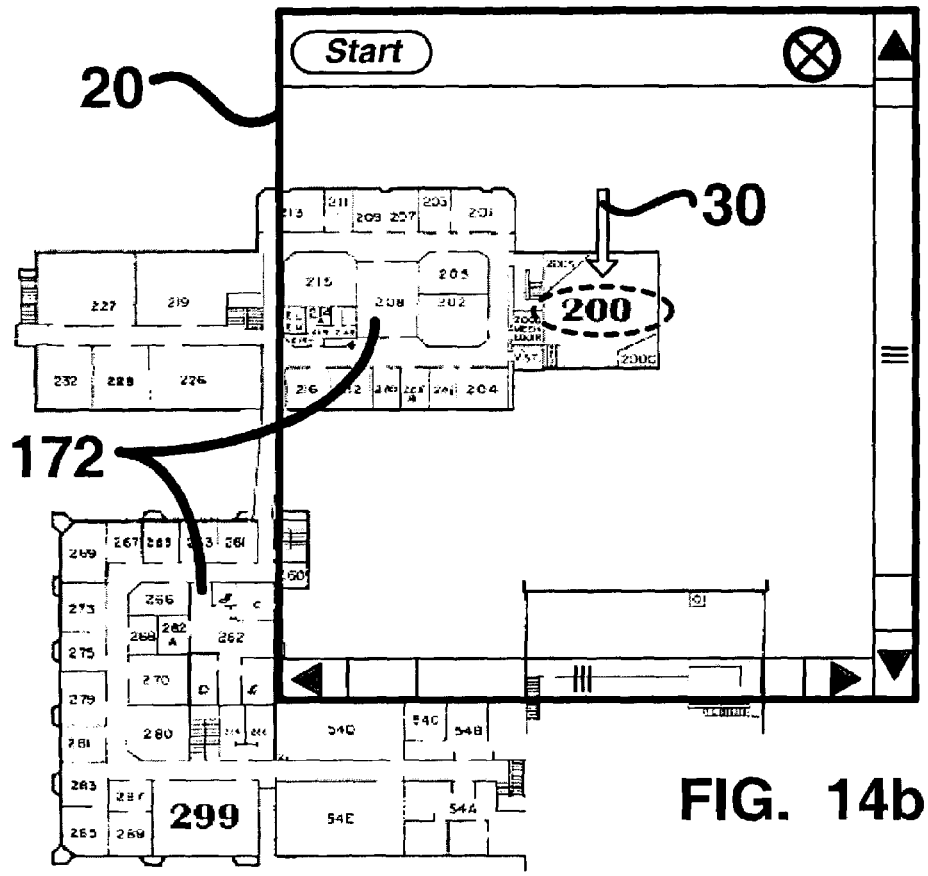
FIGS. 14a and 14b are schematic views depicting a translation and/or rotation of a holstered pointing implement to zoom in or zoom out on a selected portion of an image displayed on a display according to the present invention.
Figure 14A:
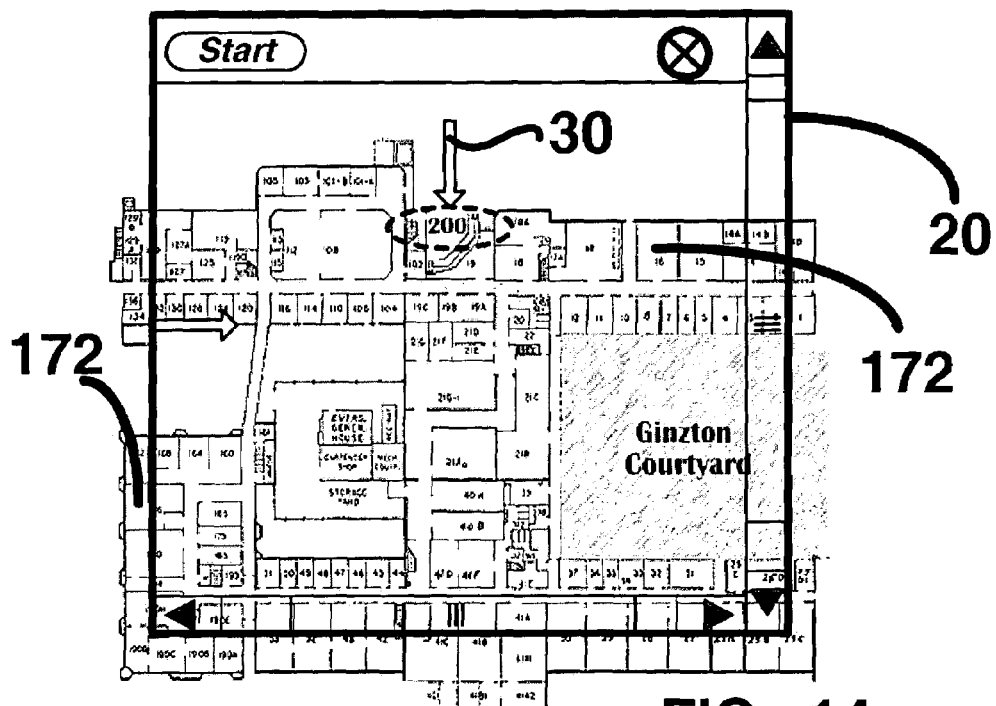

In FIG. 14a, an image of a building plan 172 is displayed on the display 20 and it is desired to zoom in and out on a portion 200 of the building plan 172. The cursor 30 can be used to circle or otherwise highlight the portion 200. In FIG. 14b, a rotation R or a translation U/D of the pointing implement 1 are used to zoom in and to zoom out on the portion 200. The movement of the cursor 30 to circle the portion 200 can be accomplished using conventional means such as the cursor pad 40, for example. The use of the pointing implement 1 in connection with a fourth sensor to move the cursor 30 will be described below.

Figure 16:
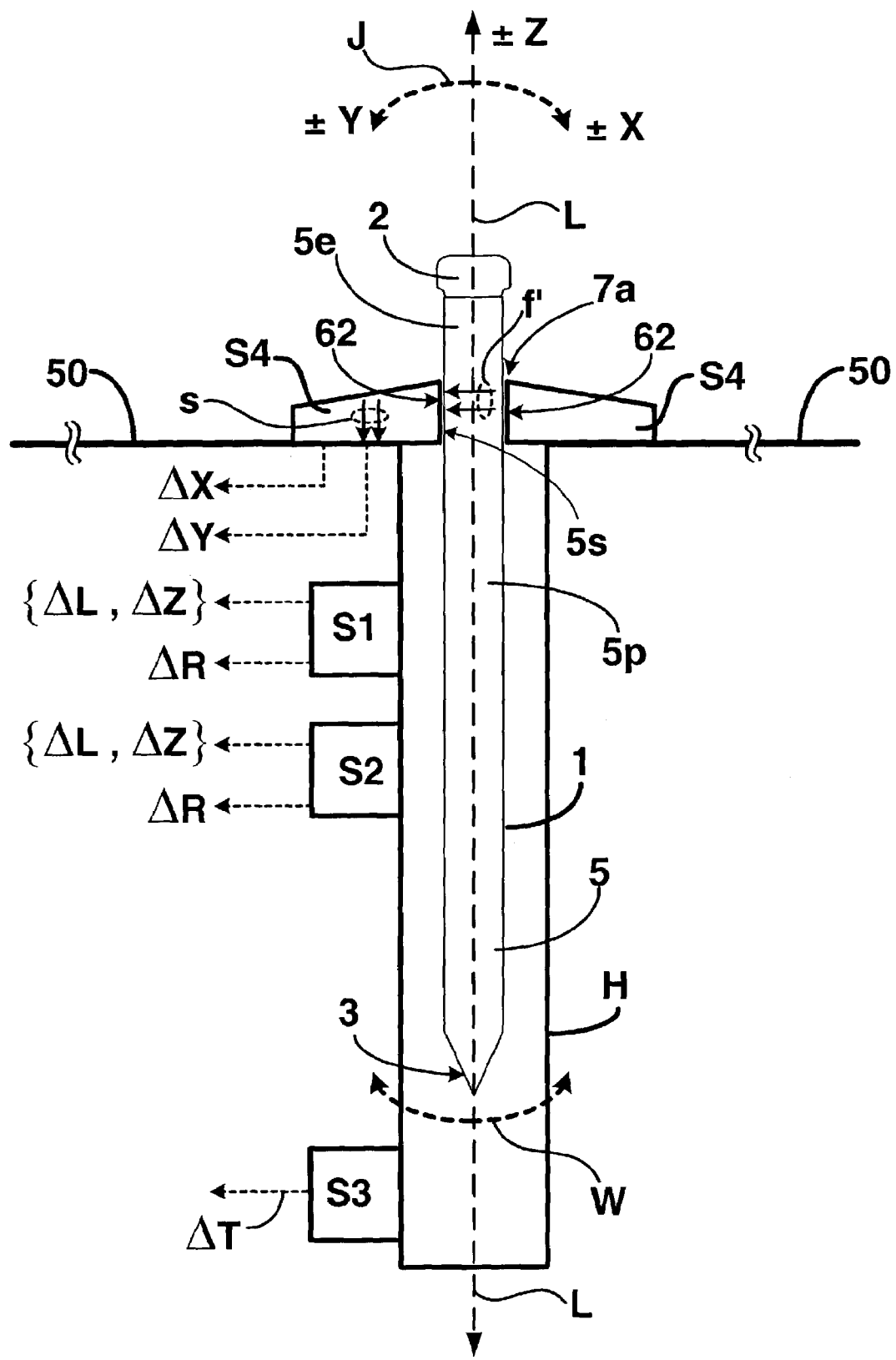
FIG. 16 is a schematic view of a fourth sensor operative to provide a joystick like action to a multifunction pointing device according to the present invention.
Figure 17:
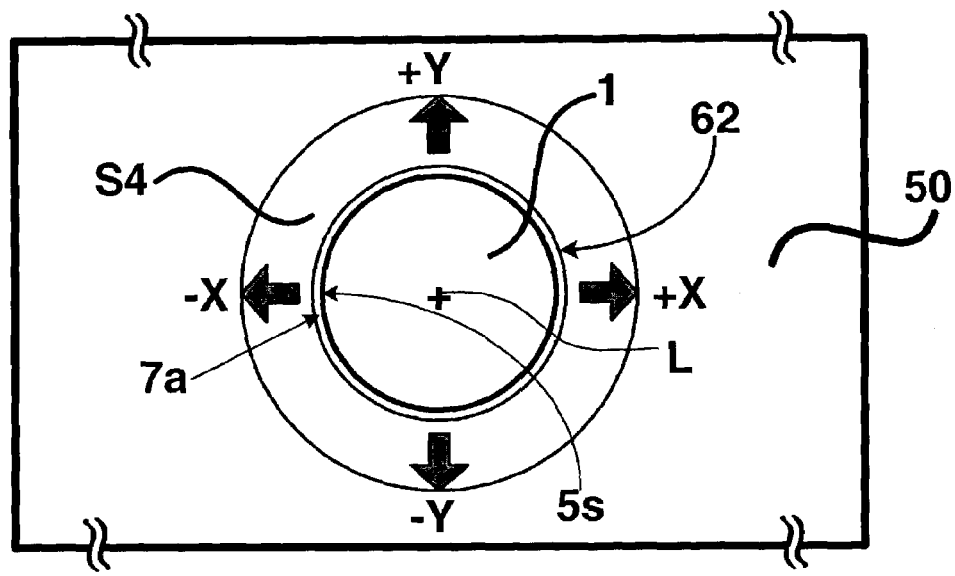
FIG. 17 is a top plan view of a fourth sensor according to the present invention.

In one embodiment of the present invention, as illustrated in FIGS. 16 and 17, the multifunction pointing device 10 includes a fourth sensor S4. The fourth sensor S4 includes a collar 62 with an opening 7a in the collar 62. The pointing implement 1 is inserted into and removed from the holster H through the opening 7a. The collar 62 is in contact with a sub-portion 5s of the shaft 5. A multi-directional motion J of the pointing implement 1 (denoted as ±X and ±Y for purposes of illustration only) urges the sub-portion 5s into contact with the collar 62 with a first force f' and the collar 62 induces a stress force s on the fourth sensor S4 in response to the first force f'. The fourth sensor S4 generates a fourth signal (ΔX, ΔY) in response to the stress force s and the electronic device 50 receives the fourth signal (ΔX, ΔY) and processes the fourth signal (ΔX, ΔY) to initiate an action.

Preferably, the alignment element 31, the resistance element 32, and the alignment-resistance element 33 are not used in this embodiment because the multi-directional motion J of the pointing implement 1 requires some movement or wiggling of the pointing implement 1 in the holster H as depicted by the W at the tip 3 in FIG. 16.

However, the collar 62 can include a resistance element, an alignment element, or a alignment-resistance element that operate in the same manner as described above in reference to FIGS. 7a through 7f, with the exception that those elements are not positioned in the holster H. Instead, those elements are positioned in the collar 62 of the fourth sensor S4 and any force f (see FIGS. 7e and 7f) acts on the sub-portion 5s of the shaft 5.

The sensor S4 can be implemented using components that are well understood in the electronics and pointing arts including but not limited to a multi-axis strain gauge sensor and an isometric joystick. For example, currently available miniature joystick switches can be modified to implement the fourth sensor S4. Some of the miniature joystick switches use ceramic strain resistors and others use capacitors.

Most of the miniature joystick switches allow for three axis control for motion along a X-axis, a Y-axis, and a Z-axis. In the present invention, the fourth sensor S4 provides for control along any two axes and the translation U/D and/or the rotation R provides for control along a third axis. Therefore, it is not necessary for the miniature joystick switches to have three axis control or a center push function because the translation U/D and/or the rotation R of the pointing implement 1 can replace those functions (i.e the third of the three axes).

For example, the multi-directional motion J can be a motion along two axes including but not limited to a X-axis and a Y-axis, a X-axis and a Z-axis, and a Y-axis and a Z-axis. As another example, the multi-directional motion J can be a motion along a X-axis and a Y-axis and the translation U/D and/or the rotation R of the portion 5p of the shaft 5 can be a motion along a Z-axis.

Examples of currently available miniature joystick switches and isometric joysticks that can be adapted for use as the fourth sensor S4 include the IBM® TrackPoint® and the Toshiba® AccuPoint® that are used with QWERTY type computer keyboards as a pointing device that is manipulated by a finger of a user. Other examples of components that can be adapted for use as the fourth sensor S4 include the SMK® Corporation Micro-Joy Stick Switch (e.g. model number JXC0000-0101F) and the CTS® Corporation 3DTrackStik® (e.g. models 106, 108, and 109). The necessary adaptations to the above components to make the fourth sensor S4 would include removing the miniature finger actuated joystick element and providing the collar 62 with a through hole therein for the opening 7a.

Preferably, the collar 62 should have a shape that allows for contact with the sub-portion 5s of the shaft 5 and also allows for contact of the collar 62 with a surface of the miniature joystick switch or isometric joystick so that the stress force s generated in response to the first force f' acts on the miniature joystick switch or isometric joystick with sufficient magnitude to generate a signal of sufficient magnitude for the electronic device 50 to receive and process.

Figure 18:
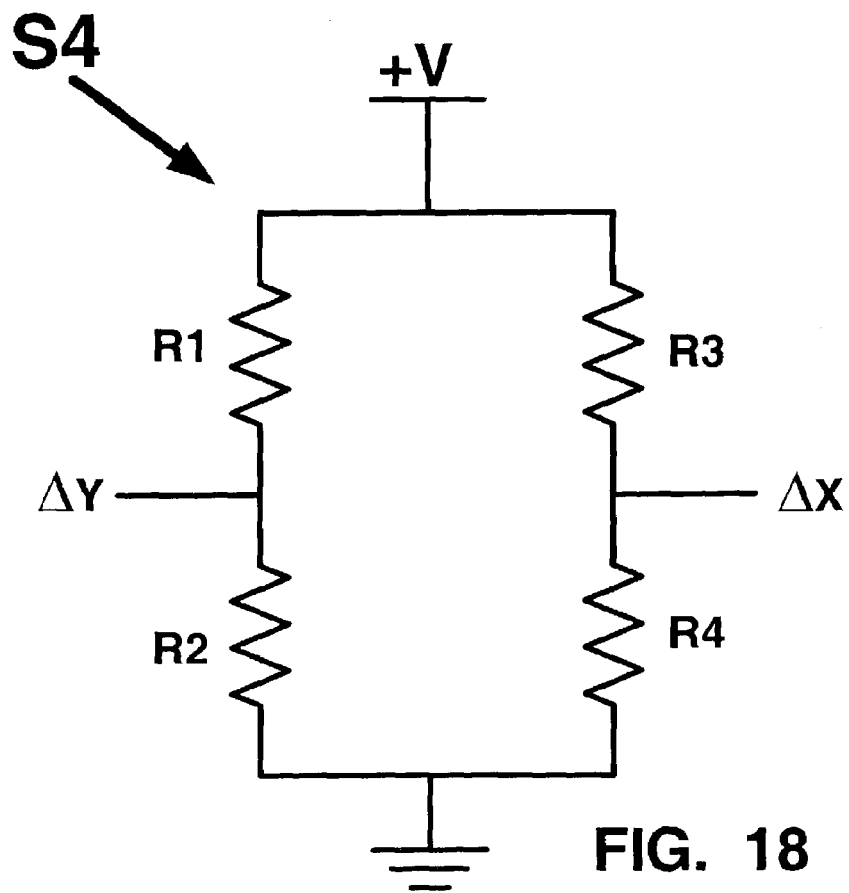

FIGS. 18, 19a, and 19b, are electrical schematics that depict an example of how the fourth sensor S4 can be implemented using ceramic strain gauge resistors in a bridge configuration. In FIG. 18, four ceramic strain gauge resistors (R1, R2, R3, and R4) are connected as shown with a signal for ΔX (e.g. ±X) taken from the junction of resistors R3 and R4 and a signal for ΔY (e.g. ±Y) taken from the junction of resistors R1 and R2.

FIG. 19a is another electrical schematic illustrating the configuration of FIG. 18 assigned to a pin layout (p1 through p6) of an electrical connector such as a flex connector or a flexible circuit board. In FIG. 19b, the fourth sensor S4 can include a ceramic strain gauge sensor chip 60 such as the types described above. The four ceramic strain gauge resistors (R1, R2, R3, and R4) are carried by the chip 60 and the terminals of the ceramic strain gauge resistors (R1, R2, R3, and R4) can be connected with pins (1 through 10) of the chip 60 as shown in FIG. 19b. The ceramic strain gauge resistors (R1, R2, R3, and R4) can be electrically connected in the manner depicted in FIGS. 18 and 19a.

In FIG. 20, the fourth sensor S4 is depicted in dashed outline in order to illustrate the how the chip 60 can be used to effectuate the multi-directional motion J. The chip 60 can be connected with a substrate 61 that is connected with the electronic device 50. For example, fasteners, glue, adhesives, or the like can be used to connect the chip 60 to the substrate 61 and to connect the substrate 61 to the electronic device 50. The substrate can be made from metal or plastic and is operative to provide a non-flexing foundation for the chip 60 so that the chip 60 is not bent, stressed, or damaged as a result of the multi-directional motion J. The collar 62 is connected with a surface 64 of the chip 60. The fourth signal (ΔX, ΔY) can be electrically communicated 66 from the chip 60 via pins, wires, a flexible PC board, a flexible connector, or the like and can be routed through a slot 63 in the electronic device 50 to circuitry (not shown) that processes the fourth signal (ΔX, ΔY) to initiate the action.

In FIGS. 20 and 21, the collar 62 can be shaped so that it includes surfaces that connect with the sub-portion 5s of the shaft 5 and connect with the surface 64 of the chip 60 such that the first force f' on the collar 62 induces the stress force s on the chip 60 which in turn induces stress on the ceramic strain gauge resistors (R1, R2, R3, and R4).

In FIG. 21, the multi-directional motion J acts on the collar 62 to provide motion inputs along ±X and ±Y axes in a manner similar to a joystick pointing device. Although the action initiated by the fourth signal (ΔX, ΔY) can be determined by hardware, software, or a combination of hardware and software and therefore can be any action that can be programmed, one use for the fourth sensor S4 is to control the movement of the cursor 30, at the same time, the pointing element 1 can be used to scroll the screen (U/D, R) or to select icons as was described above. Another advantage of the present invention is that the multifunction pointing device 10 allows for simultaneous use of the first, second, third, and fourth sensors (S1, S2, S3, and S4) and the signals from those sensors can initiate any action that can be programmed using software, hardware, or a combination of hardware and software.

In FIGS. 4c and 4d, the multifunction pointing device 10 includes a first port 50c connected with the electronic device 50. A peripheral component 52 includes the holster H, the pointing element 1, and at least the first sensor S1 (not shown), and a second port 52c. The second port 52c is operative to electrically communicate with the first port 50c. For example, the second port 52c can include electrical contacts 52p that mate with electrical contacts (not shown) in the first port 50c so that electrical signals (e.g. power supply and the first signal ΔL, ΔR) can be communicated between the electrical device 50 and the peripheral component 52. The peripheral component 52 can include the above mentioned second, third, and fourth sensors (S2, S3, and S4).

At least the first signal (ΔL, ΔR) is communicated between the electrical device 50 and the peripheral component 52 to initiate the action in the electronic device 50 in response to the first signal (ΔL, ΔR). However, the peripheral component 52 may draw its power supply from the electrical device 50, therefore requiring power to also be communicated from the electrical device 50 to the peripheral component 52. If the second, third, and fourth sensors (S2,S3, and S4) are included in the peripheral component 52, then the signals for those sensors, as described above, are also communicated between the electronic device 50 and the peripheral component 52 to initiate their respective actions in the electronic device 50.

The first signal (ΔL, ΔR), or any of the other signals from the second, third, and fourth sensors (S2, S3, and S4), can be electrically communicated using a proprietary communications protocol or a standard communications protocol including but not limited to a USB® protocol, a serial protocol, a Bluetooth® protocol, an IrDA® protocol, and an IEEE 1394® protocol. The use of standard protocols has the advantages of leveraging existing software, development tools, and drivers. Additional advantages include using standard connectors for the first and second ports (50c, 52c). For example, a standard male and female USB® connector can be used for the first and second ports (50c, 52c).

The peripheral component 52 is connected with the electronic device 50 by docking (see arrows d) the peripheral component 52 with the electronic device 50. Once docked, the first and second ports (50c, 52c) are mated with each other so that the aforementioned signals can be electrically communicated. The first and second ports (50c, 52c) can have shapes that are designed to complement each other to facilitate the mating of the ports.

The peripheral component 52 can be docked with the electronic device 50 along any portion of the electronic device 50 including but not limited to the left hand side 50L, the right hand side 50R, the top side 50T, and the bottom side 50B.

In FIG. 4d, an alignment element 50a on the electronic device 50 can be used to mate with an alignment element 52a on the peripheral component 52 so that the electronic device 50 and the peripheral component 52 are properly aligned with each other when docked. The alignment element 50a can be a receptacle such as a hole or aperture and the alignment element 52a can be a post or pin that complements a profile (i.e. a shape) of the alignment element 50a so that the alignment elements (50a, 52a) mate with each other when the electronic device 50 and the peripheral component 52 are docked. The alignment elements (50a, 52a) can also be used to ensure that the first and second ports (50c, 52c) properly engage and mate with each other during docking.

Figure 15:
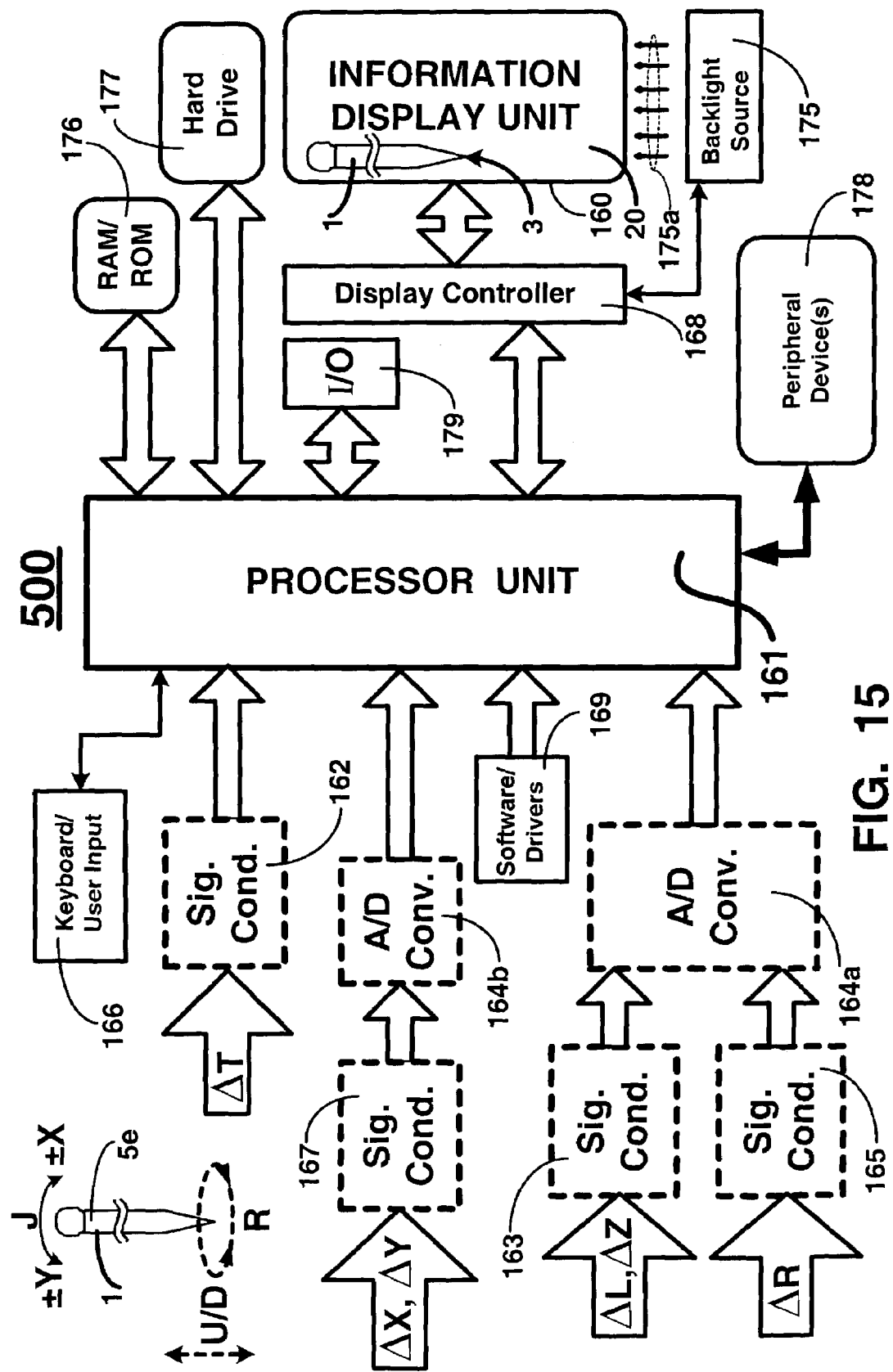
FIG. 15 is a block diagram of an example of a system that receives signals generated by any of the first, second, third, and fourth sensors and initiates an action according to the present invention.

In FIG. 15, a block diagram of an example of a system 500 that receives signals generated by any of the first, second, third, and fourth sensors (S1, S2, S3, and S4) and initiates an action based on software, hardware, or hardware and software. The system 500 can represent the electronic device 50 or the peripheral component 52 docked with the electronic device 50.

The system 500 can include a processor unit 161 (e.g. a microprocessor), a display unit 160 that can be the display 20, a backlight source 175 for generating light 175a to backlight the display unit 160, a display controller 168 for driving the display 160, memory elements including: a RAM and/or ROM 176; and a hard drive 177; one or more peripheral devices 178, an input/output unit 179, a keyboard/user input unit 166, and Software and/or Drivers 169 that can determine which actions are initiated by the signals processed from the first, second, third, and fourth sensors (S1, S2, S3, and S4) as will be described below in reference to FIGS. 22a through 25.

As described above, the first, second, third, and fourth sensors (S1, S2, S3, and S4) generate signals that are received by the electronic device 50 which in turn processes those signals to initiate actions. Those signals are generated as the result of the translation U/D and/or rotation R, the movement of the pointing implement 1 to or from the rest position, or the multi-directional motion J. The system 500 may optionally include signal conditioning units (162, 163, 165, 167). The signal conditioning units can perform functions including debouncing the signal ΔT from the third sensor S3 if mechanical switches are used to implement the third sensor S3 and conditioning analog signals that are generated by the sensors S1, S2, and S4. For instance, op-amps may be required to amplify the analog signals (ΔX, ΔY) from the fourth sensor S4. If any of the signals from the first, second, third, and fourth sensors (S1, S2, S3, and S4) are analog signals, then optionally, analog-to-digital converters 164a and 164b can be used to convert those signals into digital signals that can be processed by the processor unit 161.

In FIGS. 22a and 22b, the actions that are initiated by the electronic device 50 in response to the signals from the first, second, third, and fourth sensors (S1, S2, S3, and S4) can be determined by an algorithm or software program stored on a computer readable medium such a RAM, ROM, Flash Memory, EPROM, EEPROM, CD-ROM, DVD-ROM, a Hard Disc, Floppy Disc, Optical Disc, or any other form of computer readable media.

In FIG. 22a, a computer program 301 is carried by a computer media 300 that can be read by and executed on the electronic device 50. The computer program 301 can have instructions that determine which actions are initiated in response to the signals received by the electronic device 50 from the first, second, third, and fourth sensors (S1, S2, S3, and S4). In FIG. 22b, a device driver program 303 that is carried by a computer media 302 can perform the same function as the computer program 301 of FIG. 22a; however, the device driver program 303 may be specifically optimized to work with the multifunction pointing device 10 and optimized to work with a specific operating environment or operating system such as WINDOWS®, LINIX®, and UNIX®, for example.

In FIG. 22c, a graphical users interface (GUI) program 304 can be included with the computer program 301 or the device driver program 303. The GUI 304 can provide a menu 305 that allows a user to select properties and/or configurations for the for pointing implement 1. Examples of what the menu 305 can provide include but are not limited to, scroll speed, sensitivity to a rate of translation U/D and rotation R of the pointing implement 1, whether or not the user is left-handed or right-handed, which side (50R, 50L, 50T, or 50B) the pointing implement 1 is positioned on, which aces ±X, ±Y and ±Z are controlled by the sensor S4, assigning cursor movement to the sensor S4 or to the sensors S1 and/or S2, setting a speed for the cursor 30, using the fourth sensor S4 to single-click or double-click to initiate an action in the same manner that the buttons on a mouse are used to single and double click, and assigning the function of the cursor pad 40 to the fourth sensor S4, just to name a few.

In FIG. 23, a flow diagram 310 of an algorithm for initiating an action in the electronic device 50 includes from the start 311, determining whether or not there is a movement 313 of the pointing implement 1 in the holster H (e.g. J, U/D, R). The movement 313 can be detected by the electronic device 50 receiving one or more of the signals (ΔL, ΔR, ≠X, ΔY, ΔZ) from the first, second, and fourth sensors (S1, S2, and S4). The electronic device 50 processes 315 those signals and initiates an action 317 in response to those signals. The action 317 can be programmed in software as was described above in reference to FIGS. 22a, 22b, and 22c.

Alternatively, hardware, or a combination of hardware and software can be used to initiate the action 317. If the pointing implement 1 is used in the stylus mode and therefore is completely removed from the holster H, then the flow diagram 310 does not apply. However, the flow diagram 310 does apply when the pointing implement 1 is returned to the holster H where the first, second, and fourth sensors (S1, S2, and S4) can generate signals as a result of movement 313 of the pointing implement 1.

Figure 24:
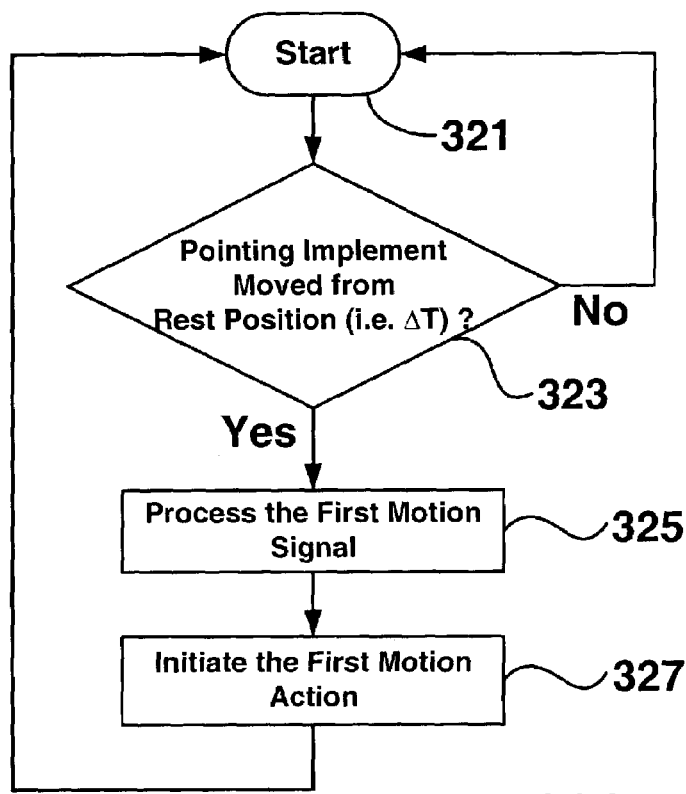
FIG. 24 is a flow diagram depicting an algorithm for initiating a first motion action resulting from a first motion signal from a third sensor according to the present invention.

In FIG. 24, a flow diagram 320 of an algorithm for initiating the first motion action in the electronic device 50 includes from the start 321, determining whether or not the pointing implement 1 has moved 323 from its rest position in the holster H. The movement from the rest position can be detected by the electronic device 50 receiving the first motion signal ΔT. The first motion signal ΔT is processed 325 by the electronic device 50 to initiate the first motion action 327. As described above, the first motion action 327 can be programmed in software, hardware, or a combination of software and hardware.

Figure 25:
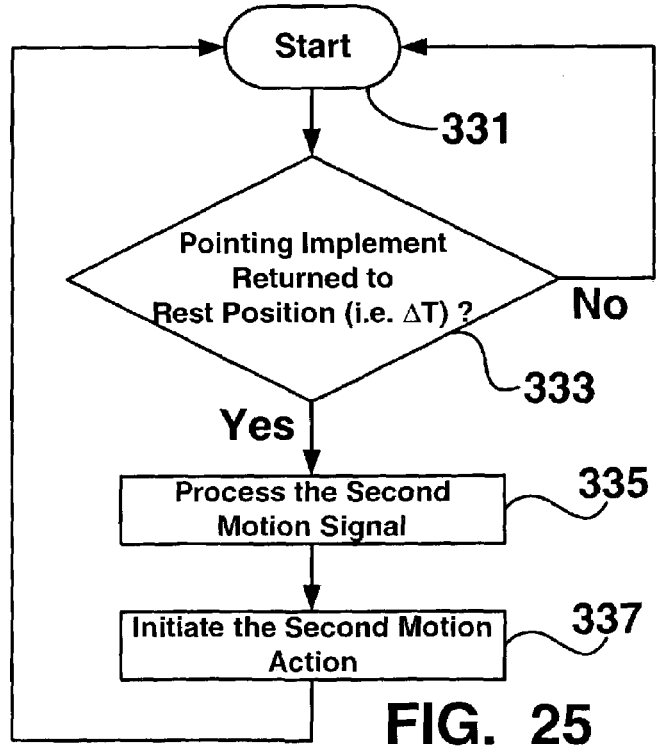
FIG. 25 is a flow diagram depicting an algorithm for initiating a second motion action resulting from a second motion signal from a third sensor according to the present invention.

Similarly, in FIG. 25, a flow diagram 330 of an algorithm for initiating the second motion action in the electronic device 50 includes from the start 331, determining whether or not the pointing implement 1 has returned 333 to the rest position in the holster H. The return to the rest position can be detected by the electronic device 50 receiving the second motion signal ΔT. The second motion signal ΔT is processed 335 by the electronic device 50 to initiate the second motion action 337. As described above, the second motion action 337 can be programed in software, hardware, or a combination of software and hardware. The signal ΔT can have opposite polarities or logic states in order to differentiate between the first and second motion signals.

Although the electronic device 50 has been illustrated using a PDA or a tablet PC as examples only, the electronic device 50 can be any electronic device including but not limited to a PDA, a tablet PC, a laptop PC, a digital camera, a cell phone, a cell phone/PDA combination device, a digital video recorder, a global positioning system (GPS), a portable game player, a data logger, and an industrial PC. The electronic device 50 can be carried by a user, can be mounted in a vehicle, or mounted to a workstation.

As one example, the electronic device 50 can be a portable digital music player that can play back digital music files such as MP3 files. The U/D and R motions of the holstered pointing implement 1 can be used to scroll through a menu of song titles displayed on the display 20 and the multi-directional motion J can be used to select a song for play back. Once the song has started playing, the multi-directional motion J can be used to control play back functions including: play/pause, fast-forward; fast-reverse; stop; and moving forward or backward by one or more tracks.

Although several embodiments of the present invention have been disclosed and illustrated, the invention is not limited to the specific forms or arrangements of parts so described and illustrated. The invention is only limited by the claims.

What is claimed is:

1. A multifunction pointing device connected with a portable hand-held electronic device, comprising:

a pointing implement including a shaft;

a holster connected with the portable hand-held electronic device and including an aperture through which the pointing implement is inserted into and removed from the holster, a portion of the shaft is positioned in the holster and is movable in a rotation about an axis and is movable in a translation along the axis;

a first sensor positioned to detect the translation and the rotation of the portion of the shaft and operative to generate a first signal in response to the translation and the rotation, and wherein the portable hand-held electronic device receives the first signal and processes the first signal to initiate an action; and a second sensor including a collar with an opening therein through which the pointing implement is inserted into and removed from the holster, the collar is in contact with a sub-portion of the shaft, wherein a multi-directional motion of the pointing implement urges the sub-portion into contact with the collar with a first force, the collar is operative to induce a stress force on the second sensor in response to the first force, and the second sensor is operative to generate a second signal in response to the stress force, and wherein the electronic device receives the second signal and processes the second signal to initiate the action.

2. The multifunction pointing device of claim 1, wherein the second sensor is a component selected from the group consisting of a multi-axis strain gauge sensor and an isometric joystick.

3. The multifunction pointing device of claim 1, wherein the multi-directional motion of the pointing implement is a motion along two axes selected from the group consisting of a X-axis and a Y-axis, a X-axis and a Z-axis, and a Y-axis and a Z-axis.

4. The multifunction pointing device of claim 1, wherein the multi-directional motion of the pointing implement is a motion along two axes consisting of a X-axis and a Y-axis and wherein a selected one or both of the translation and the rotation of the portion of the shaft comprises a Z-axis motion.

5. A multifunction pointing device connected with a portable hand-held electronic device, comprising:

a pointing implement including a shaft;

a holster connected with the portable hand-held electronic device and including an aperture through which the pointing implement is inserted into and removed from the holster, a portion of the shaft is positioned in the holster and is movable in a rotation about an axis and is movable in a translation along the axis;

a first sensor positioned to detect the translation and the rotation of the portion of the shaft and operative to generate a first signal in response to the translation and the rotation, and wherein the portable hand-held electronic device receives the first signal and processes the first signal to initiate an action;

a first port connected with the electronic device; and a peripheral component including the holster, the first sensor, the pointing implement, and a second port connected with the peripheral component and operative to electrically communicate with the first port; and wherein the peripheral component is connected with the electronic device by docking the peripheral component with the electronic device and at least the first signal is electrically communicated between first port and the second port to initiate the action in the electronic device in response to the first signal;

a first alignment element connected with the electronic device; a second alignment element connected with the peripheral component, the first and second alignment elements include profiles adapted to complement each other; and wherein the first and second alignment elements are operative to mate with each other when the electronic device and the peripheral component are docked and are operative to align the peripheral component and the electronic device with each other.

* * * * *

UNITED STATES PATENT AND TRADEMARK OFFICE
CERTIFICATE OF CORRECTION

| | |
|---|---|
| PATENT NO. | : 7,102,626 B2 |
| APPLICATION NO. | : 10/423508 |
| DATED | : September 5, 2006 |
| INVENTOR(S) | : Trueman H Denny, III |

It is certified that error appears in the above-identified patent and that said Letters Patent is hereby corrected as shown below:

In column 2, line 7, delete "215" and insert -- 251 --, therefor.

In column 9, line 39, delete "element" and insert -- implement --, therefor.

In column 10, line 52, delete "element" and insert -- implement --, therefor.

In column 12, line 62, delete "means" and insert -- materials --, therefor.

In column 13, line 12, delete "implement" and insert -- device --, therefor.

In column 13, line 23, insert -- element -- before "32".

In column 14, line 5, delete "if" and insert -- it --, therefor.

In column 15, line 41, delete "point" and insert -- pointing --, therefor.

In column 19, line 12, delete "element" and insert -- implement --, therefor.

In column 19, line 23, delete "element" and insert -- implement --, therefor.

In column 19, line 45, delete "electronic" and insert -- electrical --, therefor.

In column 21, line 25, delete "aces" and insert -- axes --, therefor.

In column 21, line 39, delete "$\neq X$" and insert -- $\Delta X$ --, therefor.

Signed and Sealed this

Twenty-second Day of December, 2009

David J. Kappos
*Director of the United States Patent and Trademark Office*